(12) United States Patent
Needel et al.

(10) Patent No.: US 11,193,575 B2
(45) Date of Patent: Dec. 7, 2021

(54) MODULAR GEAR TRANSMISSION AND ASSOCIATED SYSTEM

(71) Applicant: REV ROBOTICS LLC, Carrollton, TX (US)

(72) Inventors: Gregory Elliott Needel, Carrollton, TX (US); Francisco Musiol Lima, Carrollton, TX (US); David Aaron Yanoshak, Carrollton, TX (US); Jonathan James Bryant, Carrollton, TX (US); Michael Andrew Kaurich, Carrollton, TX (US)

(73) Assignee: REV ROBOTICS LLC, Carrollton, TX (US)

( * ) Notice: Subject to any disclaimer, the term of this patent is extended or adjusted under 35 U.S.C. 154(b) by 28 days.

(21) Appl. No.: 16/778,985

(22) Filed: Jan. 31, 2020

(65) Prior Publication Data

US 2021/0048097 A1    Feb. 18, 2021

Related U.S. Application Data

(60) Provisional application No. 62/888,233, filed on Aug. 16, 2019.

(51) Int. Cl.
*F16H 57/033* (2012.01)
*F16H 57/023* (2012.01)
(Continued)

(52) U.S. Cl.
CPC ............. *F16H 57/033* (2013.01); *F16H 1/28* (2013.01); *F16H 1/46* (2013.01); *F16H 37/041* (2013.01);
(Continued)

(58) Field of Classification Search
CPC .... F16H 57/033; F16H 57/023; F16H 57/082; F16H 1/28; F16H 1/46; F16H 37/041;
(Continued)

(56) References Cited

U.S. PATENT DOCUMENTS

| 8,277,358 B2* | 10/2012 | Gasparrini | E06B 9/68 475/331 |
| 2013/0040777 A1* | 2/2013 | Gassmann | F16H 1/46 475/337 |
| 2014/0371028 A1* | 12/2014 | Billmeyer | F16H 1/46 475/337 |

FOREIGN PATENT DOCUMENTS

CA        2344813 A1 *  3/2000  ............... F16H 1/46

* cited by examiner

*Primary Examiner* — Tisha D Lewis
(74) *Attorney, Agent, or Firm* — David W. Carstens; Brandon V. Zuniga; Carstens & Cahoon, LLP

(57) ABSTRACT

A modular gear transmission and associated systems. The modular gear transmission has an assembled configuration, and the modular gear transmission includes a first transmission body and a first transmission gear set. The first transmission gear set includes a first protruding gear, a first intermediate gear set including at least one intermediate transmission gear, and a first transmission socket. The first transmission body is configured so that, when the modular gear transmission is in the assembled configuration, the first transmission body engages the first transmission gear set to hold the first transmission gear set in a rotatable configuration. The first protruding gear is configured so that, when the modular gear transmission is in the assembled configuration, the first protruding gear protrudes from the first transmission body and is rotatably engaged with the first intermediate gear set, the first protruding gear configured to rotate around a first referential axis of rotation.

22 Claims, 13 Drawing Sheets

(51) Int. Cl.
*F16H 1/28* (2006.01)
*F16H 57/08* (2006.01)
*F16H 1/46* (2006.01)
*F16H 37/04* (2006.01)

(52) U.S. Cl.
CPC ......... *F16H 57/023* (2013.01); *F16H 57/082* (2013.01); *F16H 2001/289* (2013.01); *F16H 2057/0235* (2013.01); *F16H 2702/02* (2013.01)

(58) Field of Classification Search
CPC ....... F16H 2001/289; F16H 2057/0235; F16H 2702/02
See application file for complete search history.

MODULAR GEAR TRANSMISSION AND ASSOCIATED SYSTEM

CROSS-REFERENCE TO RELATED APPLICATIONS

This application claims priority to U.S. Provisional Application No. 62/888,233, filed Aug. 16, 2019, entitled "Modular Gear Transmission and Associated System." Each application listed in this paragraph is hereby incorporated by reference in its entirety as an example.

BACKGROUND OF THE INVENTION

Technical Field

In some aspects, the present invention relates to a modular gear transmission. In some aspects, the present invention relates to a system comprising the modular gear transmission, which system can include a robot or a component of a robot. Furthermore, in some aspects, the modular gear transmission relates to fixed gear transmissions that are interchangeable. Additionally, in some aspects, the modular gear transmission relates to fixed gear transmissions that are combinable, for example, to create a desired gear ratio between a first gear and a last gear in a combined set of gear transmissions. Moreover, in some aspects, the modular gear transmission relates to fixed gear transmission whose gears are enclosed by a transmission body that prevents the gears from being moved out of a desired rotatable relationship to each other while the transmission body is engaged with the modular gear transmission.

Description of Related Art

Existing techniques for using a driver to rotate a machine component lack desirable attributes, for example, ease of use, low cost, ease of manufacture, durability, modularity, interchangeability, combinability, and the ability to be used to change a desired rotational velocity of the machine component relative to the driver. For example, in some existing devices, a driver is connected directly to a machine component, which requires a more expensive variable speed driver to change the rotational velocity of the machine component. As another example, some existing devices used to connect a driver to a machine component are difficult to use, expensive, difficult to manufacture, easily damaged, non-modular, non-interchangeable, non-combinable, and incapable being used to provide a plurality of desired rotational velocities for the machine component relative to the driver.

Accordingly, existing techniques and associated devices for rotating a machine component with a driver have several undesirable characteristics.

SUMMARY OF SELECTED EMBODIMENTS OF THE INVENTION

In accordance with a first embodiment, a modular gear transmission is provided. The modular gear transmission having an assembled configuration, and the modular gear transmission comprising a first transmission body and a first transmission gear set. The first transmission gear set comprises a first protruding gear, a first intermediate gear set comprising at least one intermediate transmission gear, and a first transmission socket. The first transmission body is configured so that, when the modular gear transmission is in the assembled configuration, the first transmission body engages the first transmission gear set to hold the first transmission gear set in a rotatable configuration. The first protruding gear is configured so that, when the modular gear transmission is in the assembled configuration, the first protruding gear protrudes from the first transmission body and is directly or indirectly rotatably engaged with the first intermediate gear set, the first protruding gear configured to rotate around a first referential axis of rotation.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

Figure 6:
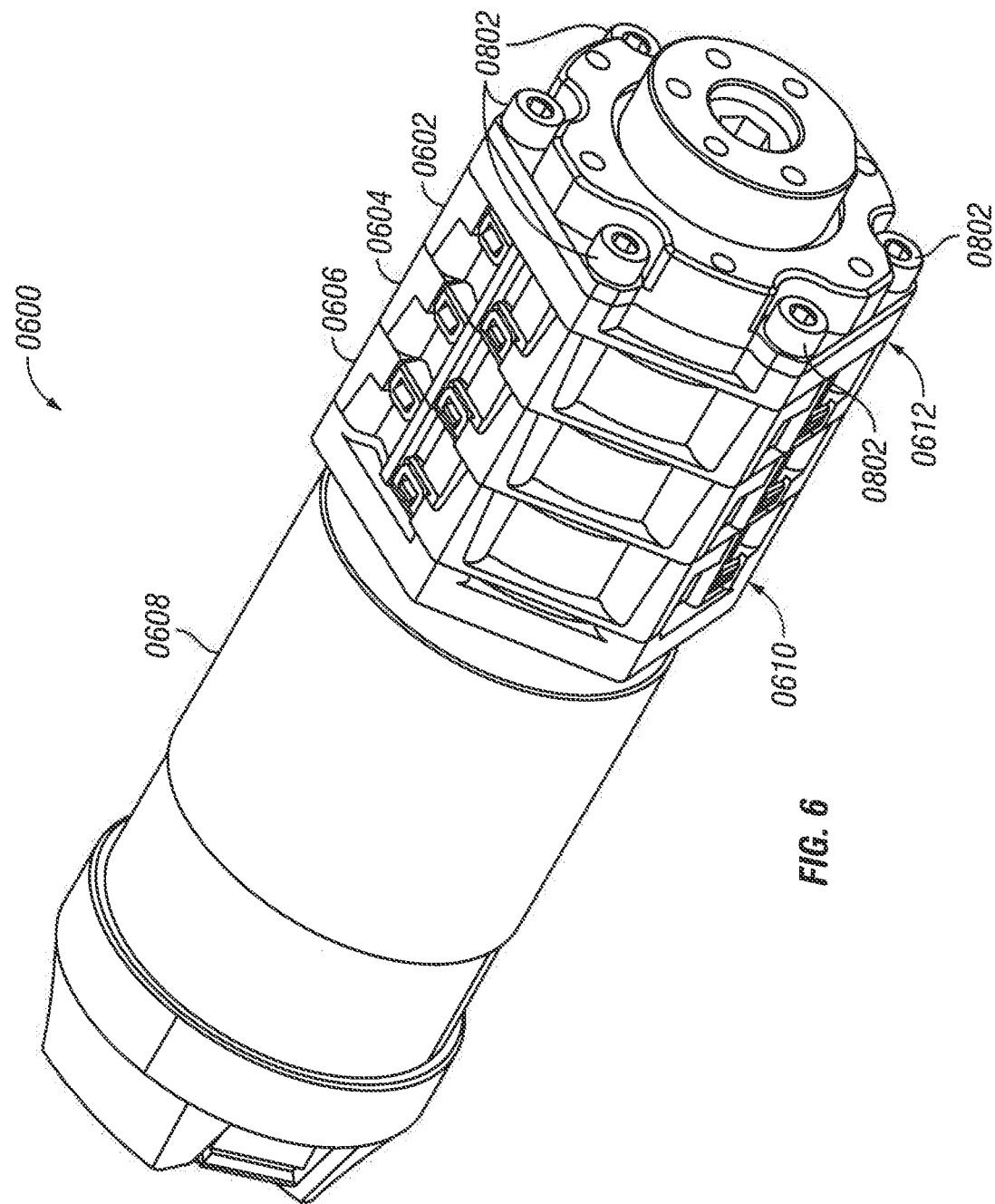

FIG. 6 a perspective view taken from the top, front and right of one embodiment of an assembled system comprising a series of rotatably engaged components in the following order: a driver, a modular gear transmission having a 5:1 gear ratio, a modular gear transmission having a 4:1 gear ratio, the modular gear transmission of FIG. 1 having a 3:1 gear ratio, and an output gear, although FIG. 6 can also be an illustration of a perspective view taken from the top, front and right of one embodiment of any assembled system comprising a series of rotatably engaged components in the following order: a driver, a plurality of modular gear transmissions rotatably engaged in series, and an output gear, with any selection of gear ratios, combination of gear ratios, or order of gear ratios being possible for the components, for example, the modular gear transmissions.

Figure 7:
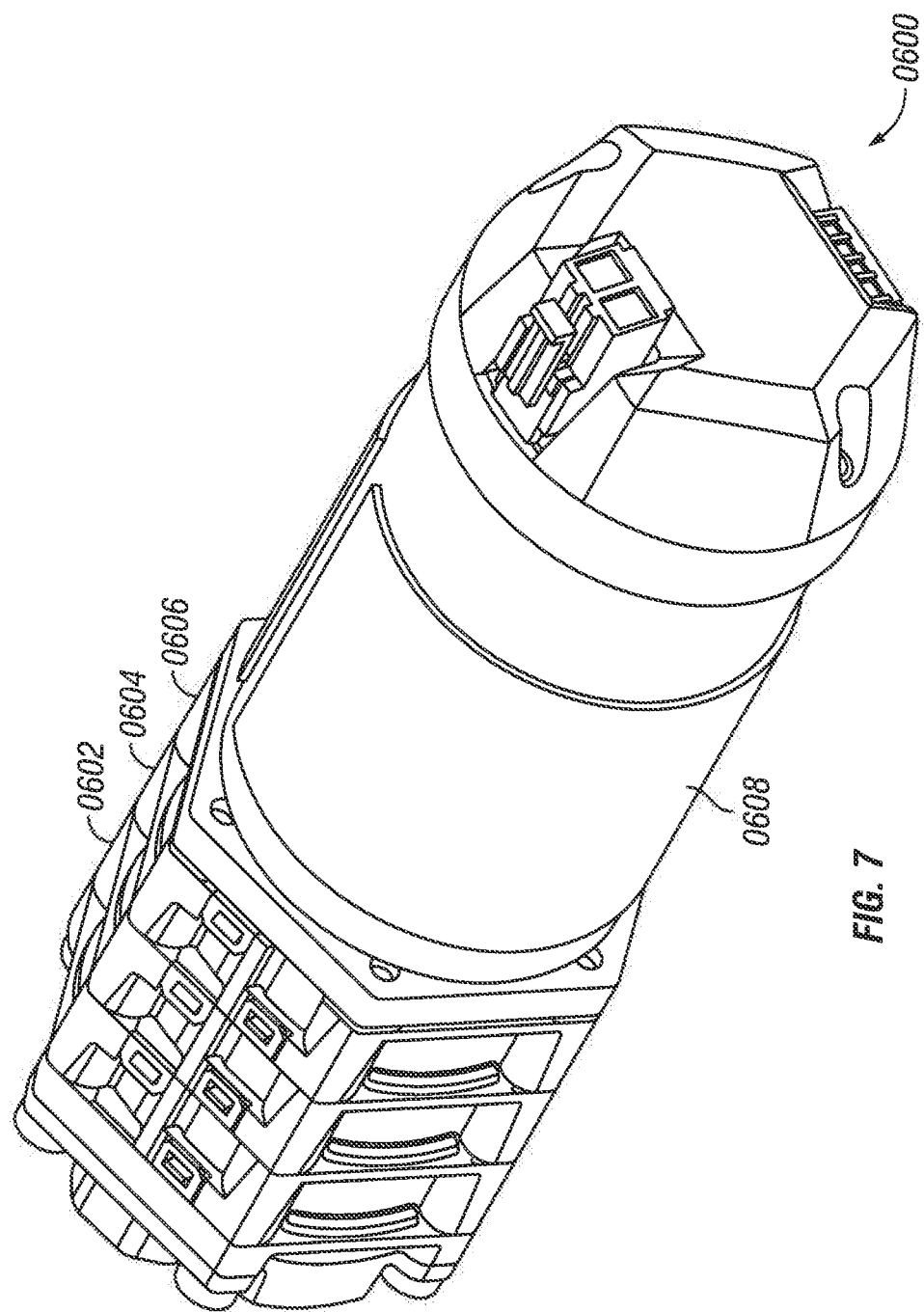

FIG. 7 is a perspective view taken from the bottom, rear and left of the assembled system of FIG. 6, although FIG. 7 can also be an illustration of a perspective view taken from the bottom, rear and left of one embodiment of any assembled system comprising a series of rotatably engaged components in the following order: a driver, a plurality of modular gear transmissions rotatably engaged in series, and an output gear, with any selection of gear ratios, combination of gear ratios, or order of gear ratios being possible for the components, for example, the modular gear transmissions.

Figure 8:
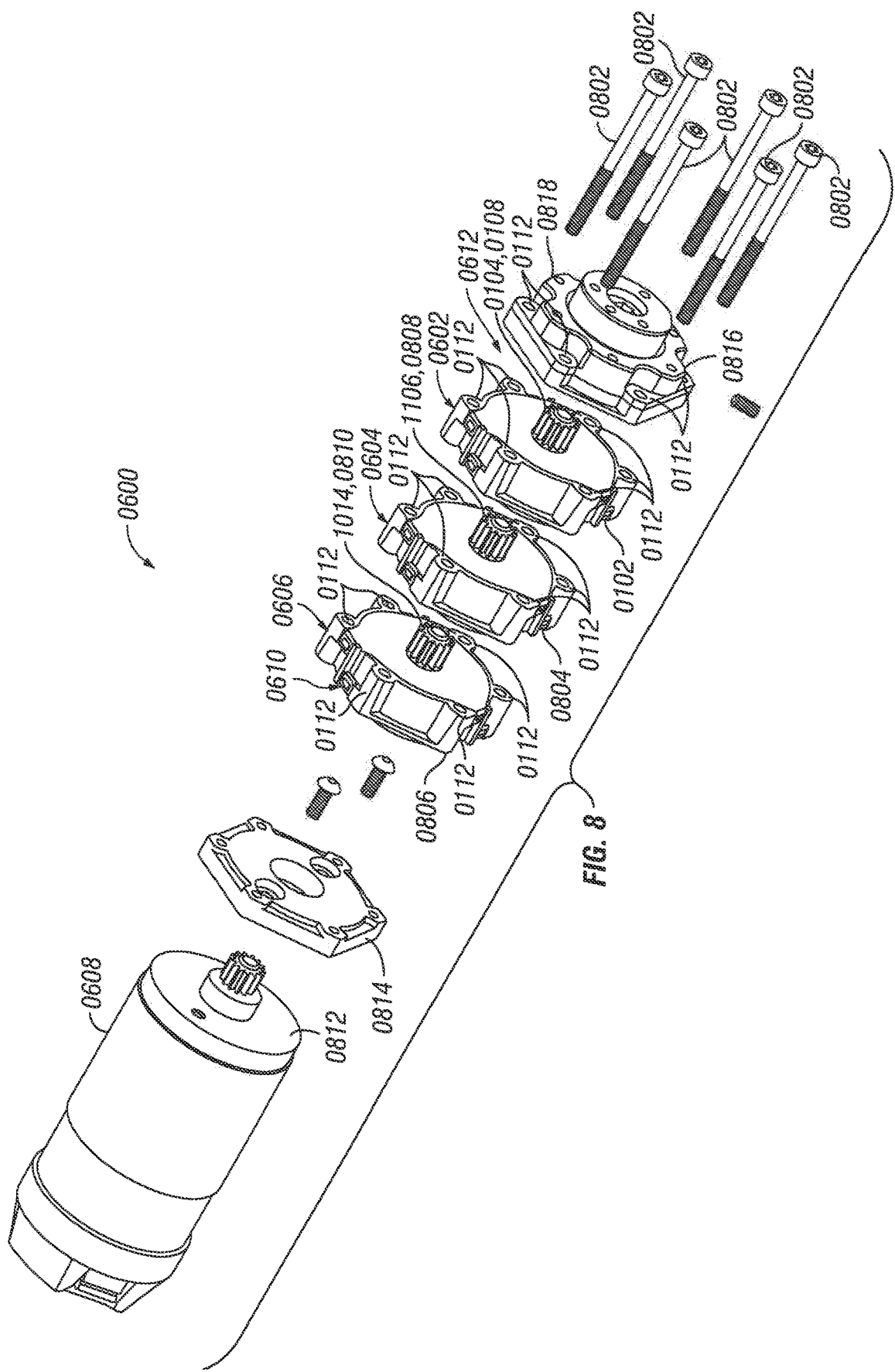

FIG. 8 is a perspective view taken from the top, front, and right of the system of FIG. 6 shown in exploded form, although FIG. 8 can also be an illustration of a perspective view taken from the top, front and right of one embodiment of any assembled system comprising a series of rotatably engaged components in the following order: a driver, a plurality of modular gear transmissions rotatably engaged in series, and an output gear, with any selection of gear ratios, combination of gear ratios, or order of gear ratios being possible for the components, for example, the modular gear transmissions.

Figure 9:
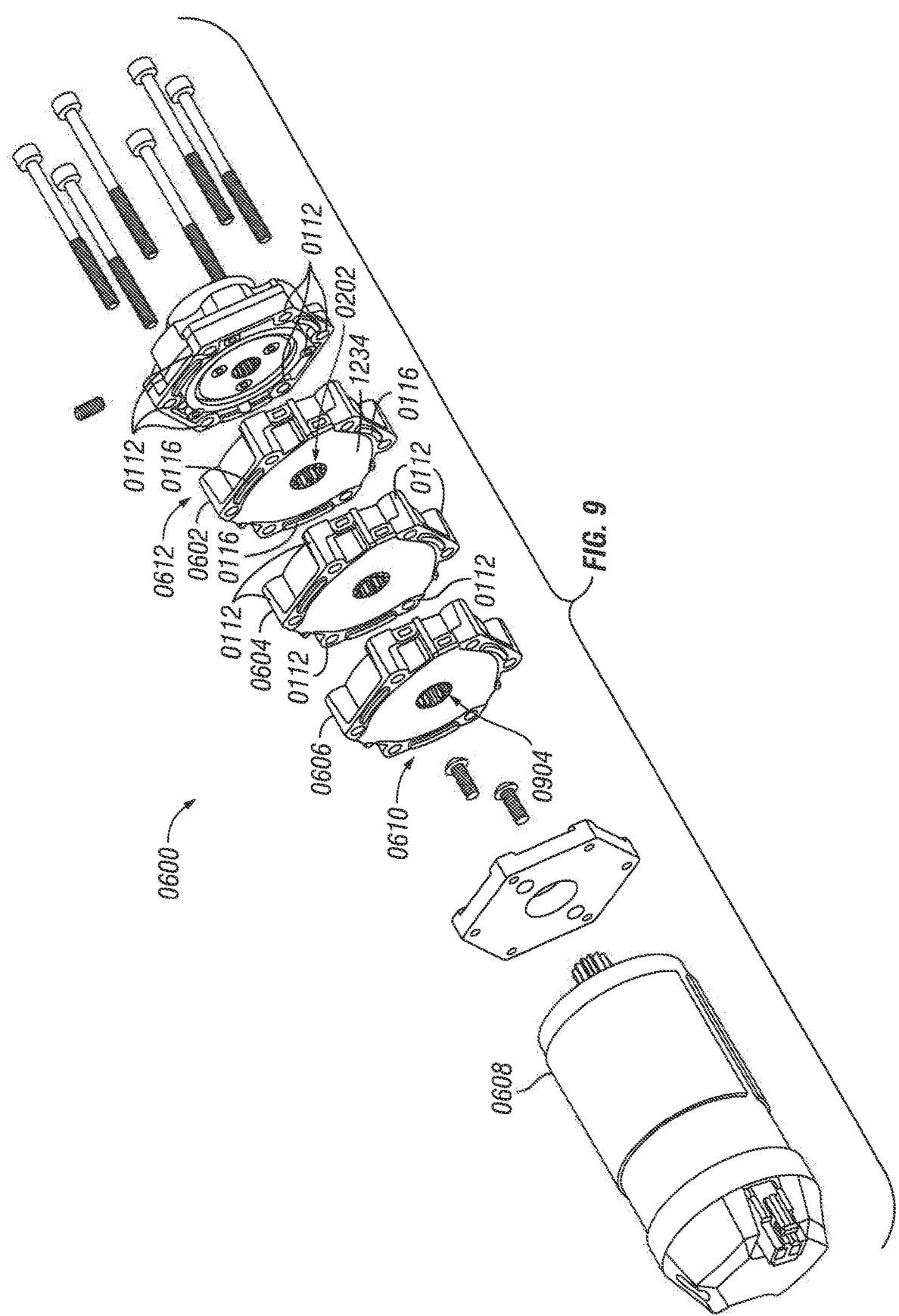

FIG. 9 is a perspective view taken from the bottom, rear, and left of the system of FIG. 6 shown in exploded form, although FIG. 9 can also be an illustration of a perspective view taken from the bottom, rear, and left of one embodiment of any assembled system comprising a series of rotatably engaged components in the following order: a driver, a plurality of modular gear transmissions rotatably engaged in series, and an output gear, with any selection of gear ratios, combination of gear ratios, or order of gear ratios being possible for the components, for example, the modular gear transmissions, depending on the configuration of the gears in the modular gear transmissions.

Figure 10:
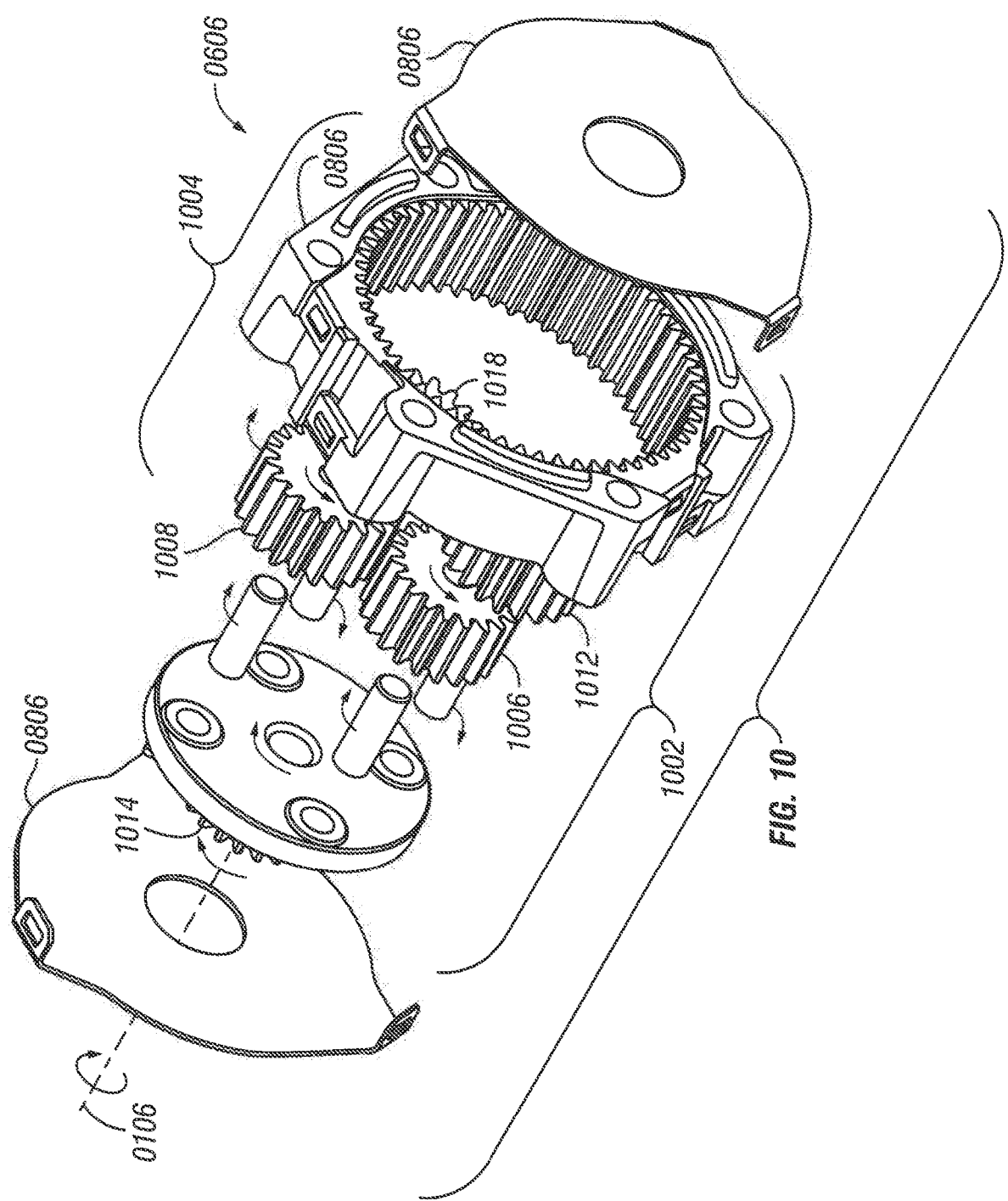

FIG. 10 is perspective view taken from the bottom, rear and left of the modular gear transmission having a 5:1 gear ratio, which is illustrated in FIG. 6.

Figure 11:
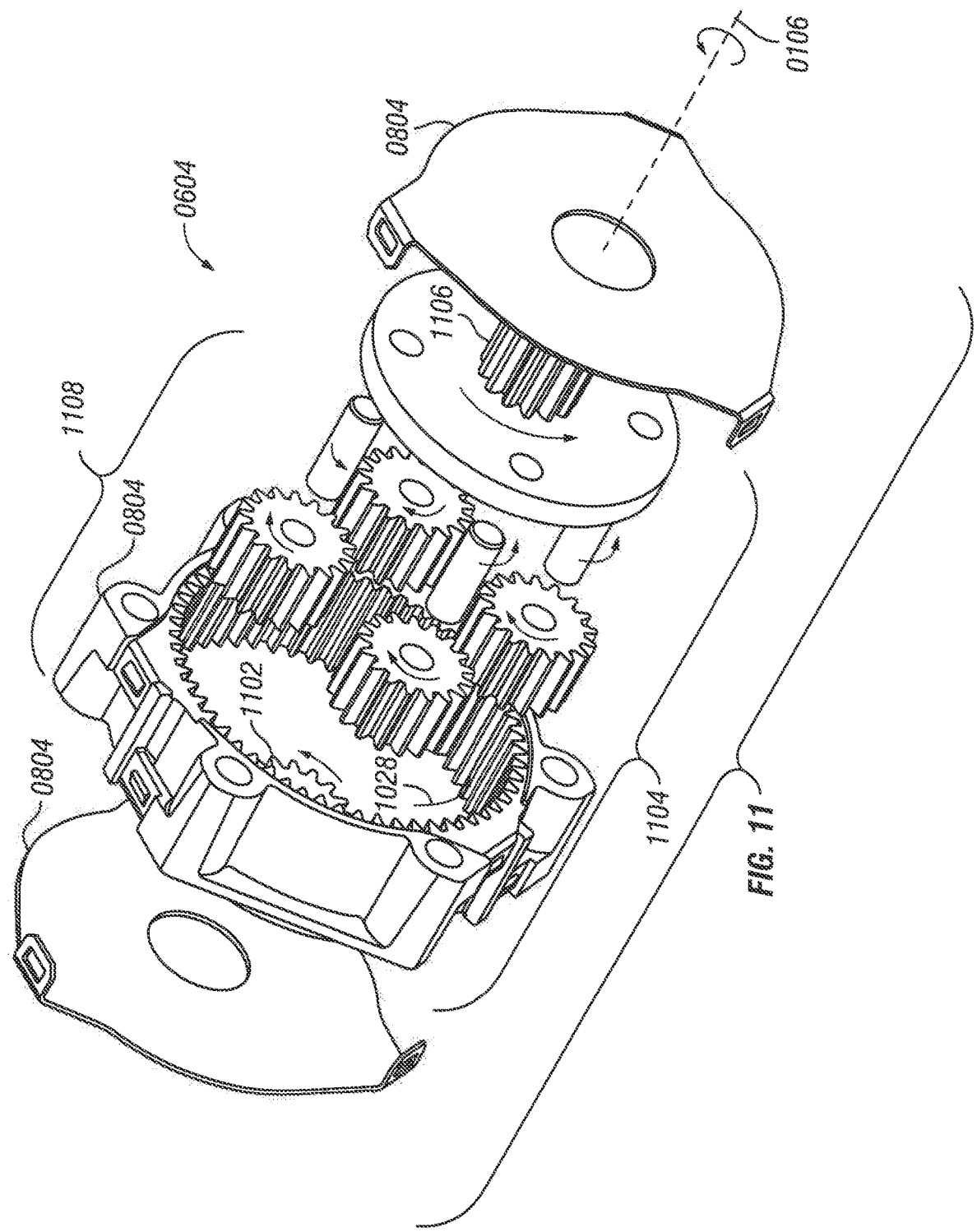

FIG. 11 is perspective view taken from the top, front and right of the modular gear transmission having a 4:1 gear ratio, which is illustrated in FIG. 6.

Figure 1:
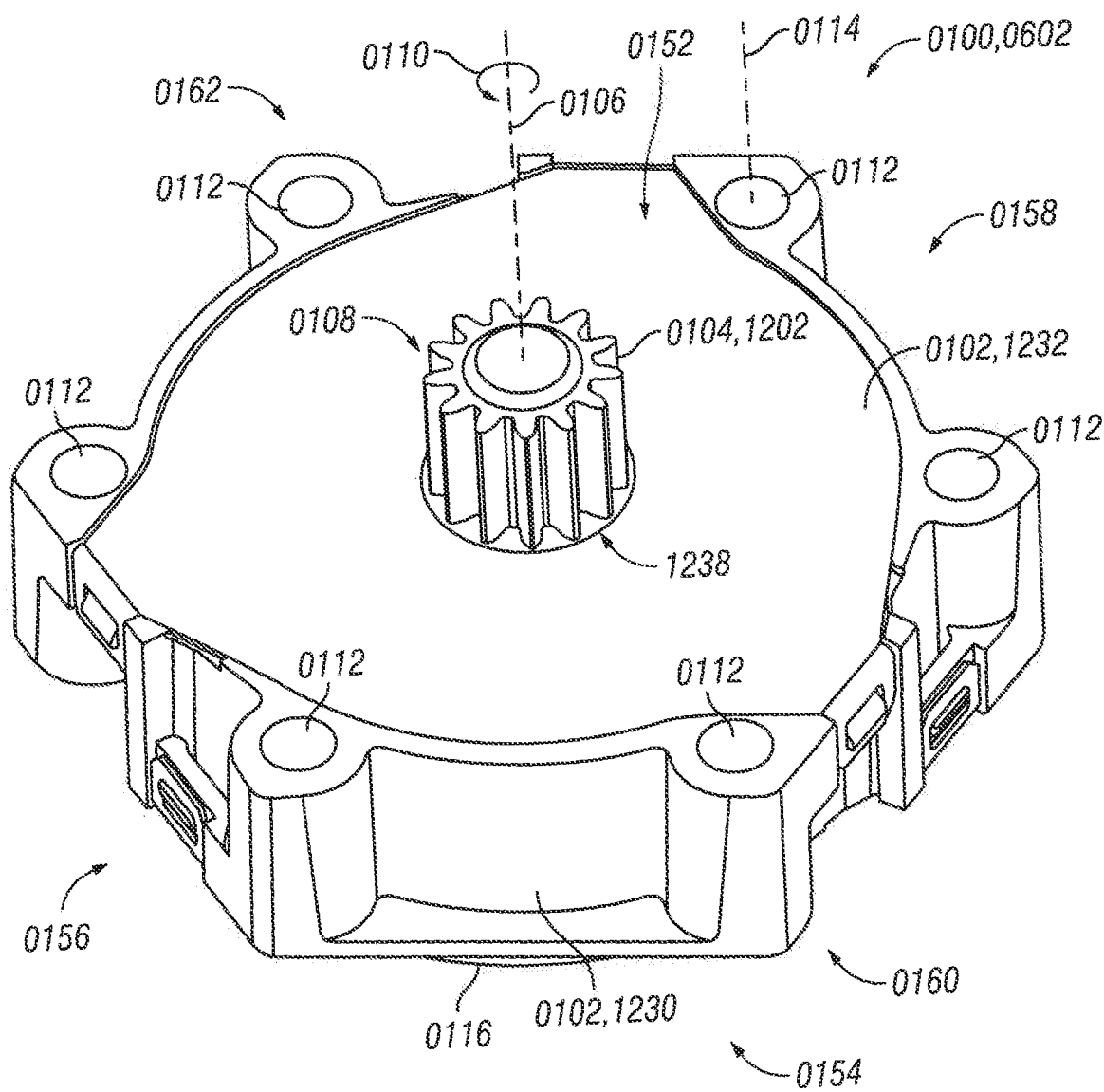
FIG. 1 is a perspective view taken from the top, front and right of one embodiment of a modular gear transmission having a 3:1 gear ratio, although FIG. 1 can also be an illustration of perspective view taken from the top, front and right of one embodiment of a modular gear transmission having a 4:1 gear ratio or a 5:1 gear ratio or any other gear ratio, which modular gear transmissions can look identical to the modular gear transmission having a 3:1 gear ratio when viewed from the top, front, rear, right and left, although modular gear transmissions having a different gear ratio can differ when viewed from the bottom due to differences in the shape of the transmission socket at the bottom of the modular gear transmission.
Figure 12:
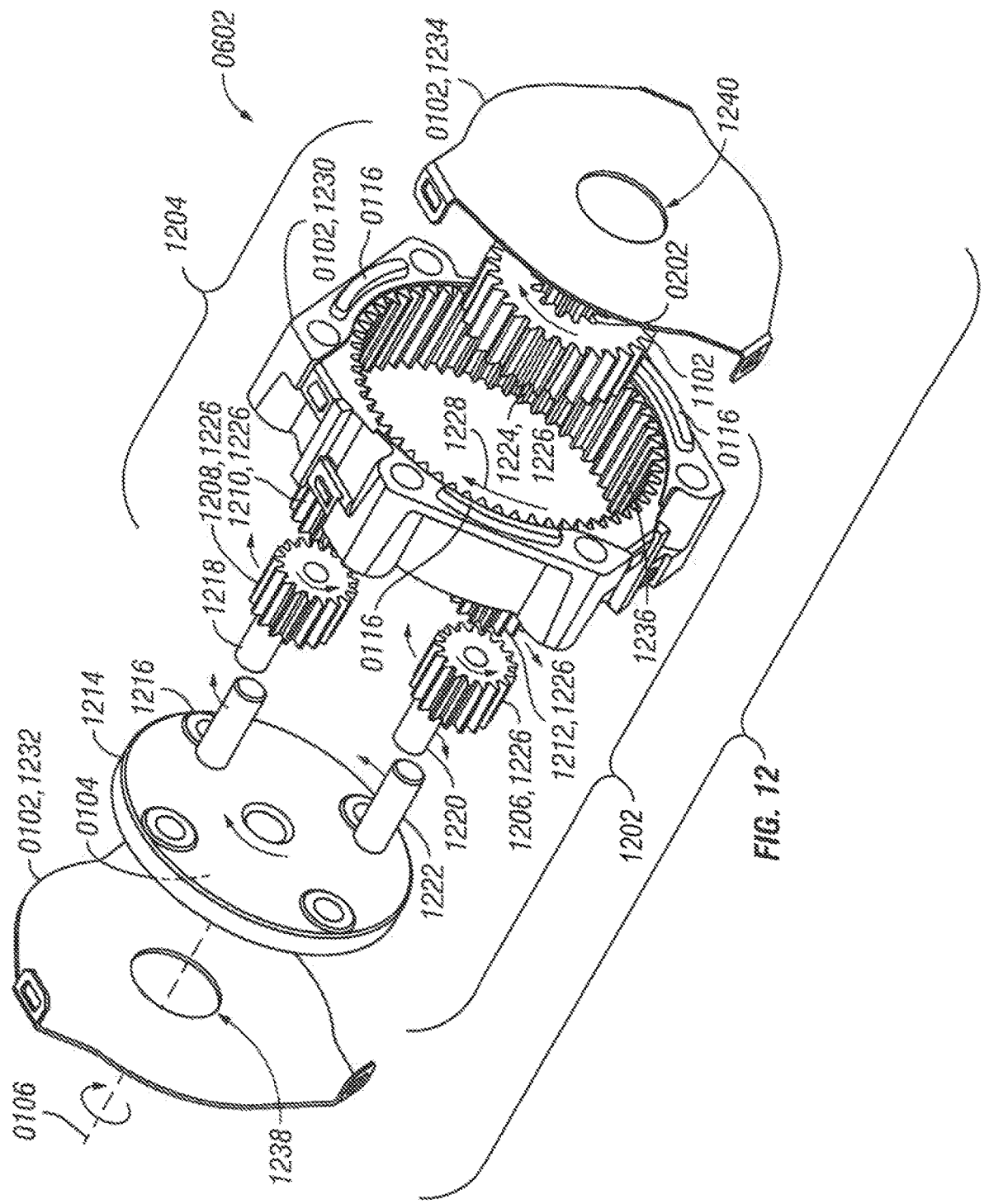

FIG. 12 is perspective view taken from the bottom, rear and left of the modular gear transmission having a 3:1 gear ratio, which is illustrated in FIG. 1 and FIG. 6.

Figure 13:
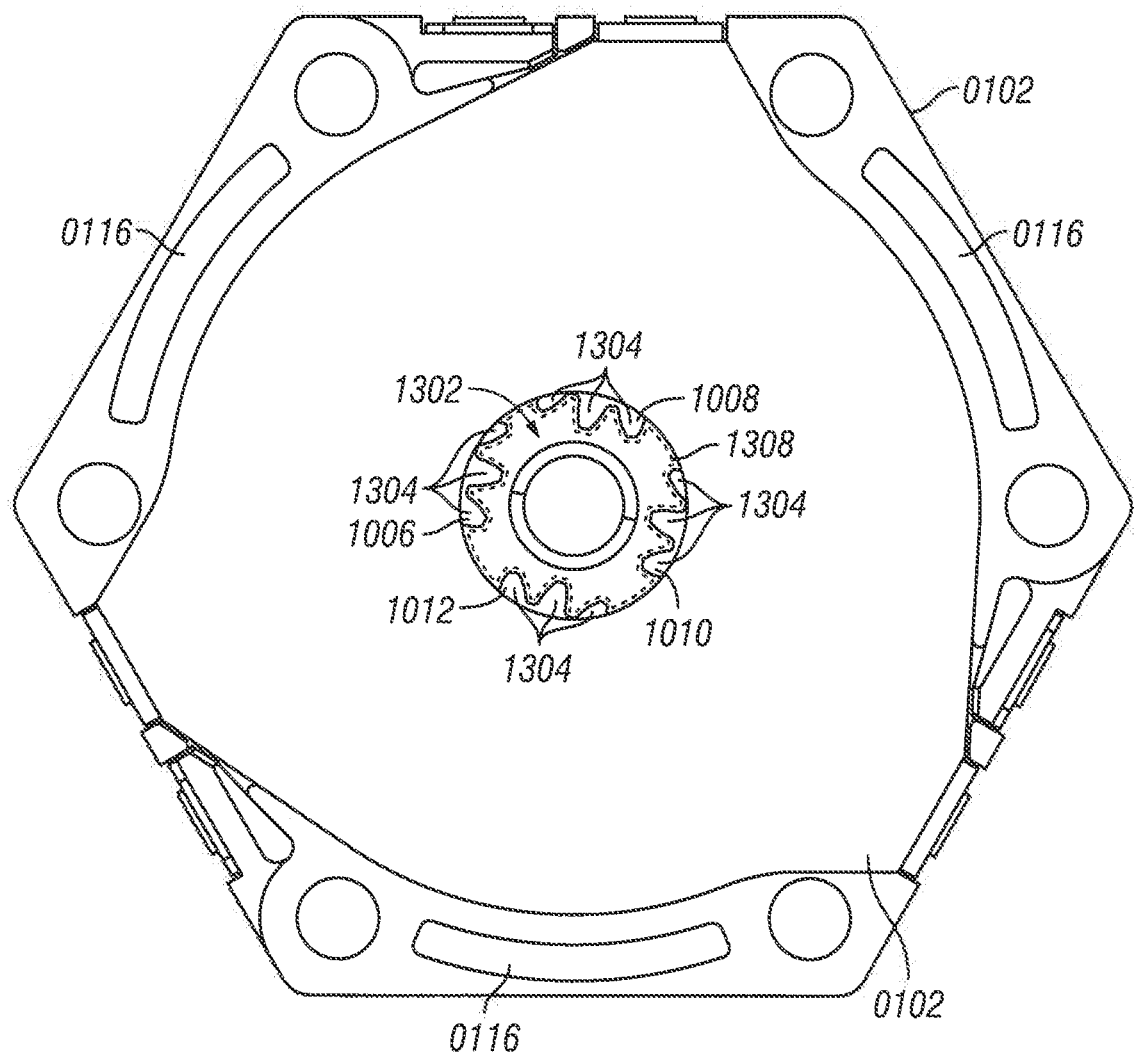

FIG. 13 is a bottom view of the modular gear transmission having a 5:1 gear ratio, which is illustrated in FIG. 6 and FIG. 10, although FIG. 13 can also be an illustration a bottom view of one embodiment of a modular gear transmission having a 4:1 gear ratio or a 3:1 gear ratio or any other gear ratio, depending on the configuration of the gears in the modular gear transmission.

DETAILED DESCRIPTION

In some embodiments, a modular gear transmission and associated system described in the present application can solve one or more problems. For example, in some embodiments, when compared to existing devices and techniques used to connect a driver to a driven machine component, the modular gear transmission and an associated system are easier to use, less expensive, easier to manufacture, more durable, more modular, more interchangeable, more suitable for combining a plurality of gear transmissions in series to provide a desired gear ratio, and more flexible with respect to providing a desired rotational velocity to the driven machine component relative to the driver. For example, the modular gear transmission and associated system can help reduce the need for a more expensive variable speed driver to change the rotational velocity of the driven machine component. These and other advantageous characteristics of embodiments of the modular gear transmission and associated systems will be further evident upon review of the present disclosure.

Referring now to FIG. 1, a perspective view of one embodiment of a modular gear transmission 0100 is provided. The modular gear transmission 0100 has an assembled configuration as illustrated in FIG. 1. As illustrated, the assembled configuration being a configuration in which the modular gear transmission can be used to rotatably engage two other rotatable components.

For purposes of description, FIG. 1 includes reference to a top 0152, bottom 0154, front 0156, rear 0158, right side 0160, and left side 0162 of the modular gear transmission 0100. Nonetheless, in this context, the terms top, bottom, front, rear, left and right are solely used for ease of reference and do not require the modular gear transmission 0100 to actually be placed in any particular orientation relative to vertical or horizontal.

With reference to FIG. 1, the modular gear transmission 0100 comprises a first transmission body 0102 and a first transmission gear set 1202 (e.g., as shown in FIG. 12).

Figure 2:
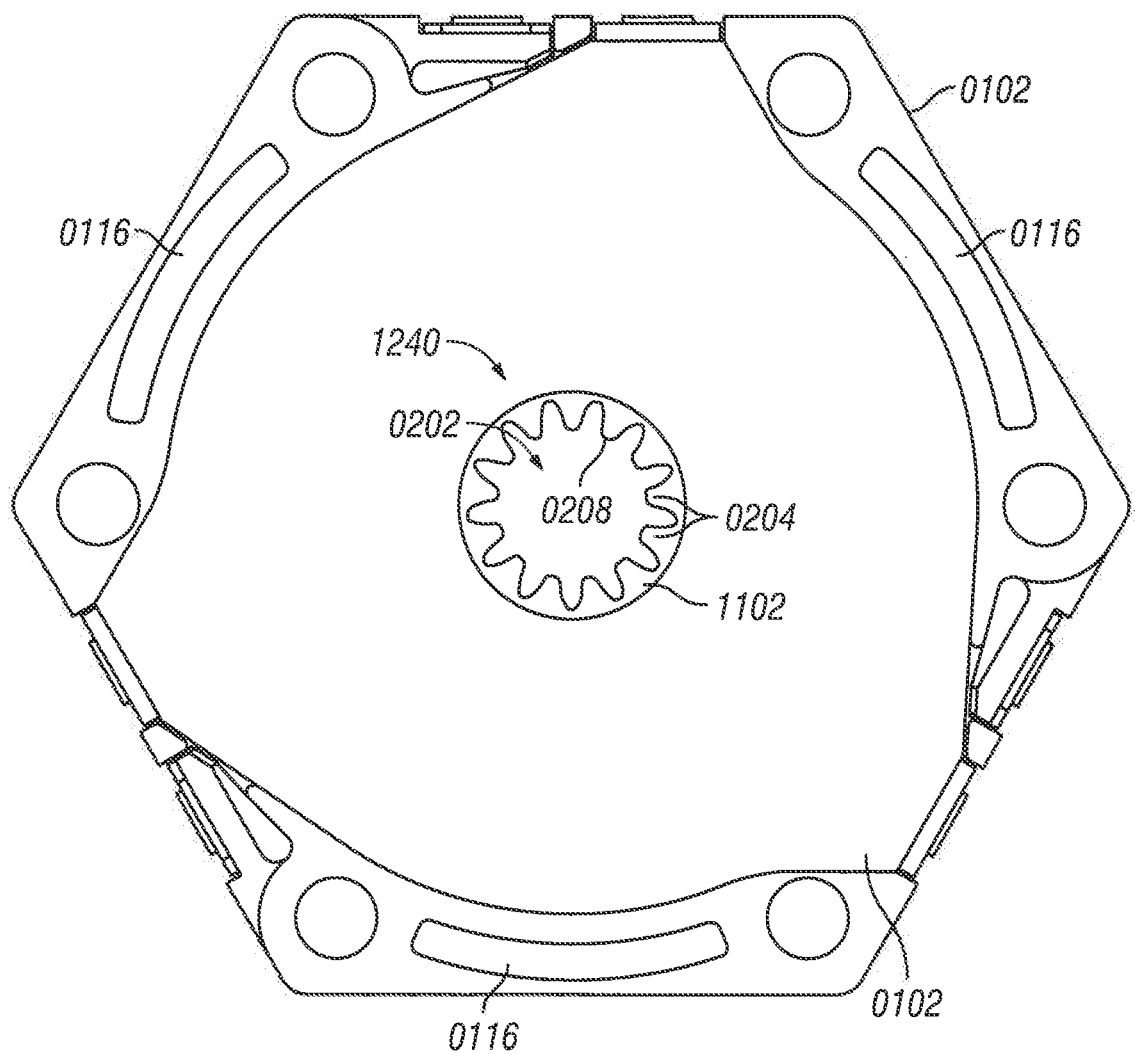
FIG. 2 is a bottom view of the modular gear transmission of FIG. 1, although FIG. 2 can also be an illustration of the bottom of one embodiment of a modular gear transmission having a 4:1 gear ratio or a 5:1 gear ratio or any other gear ratio, depending on the configuration of the gears in the modular gear transmission.
Figure 3:
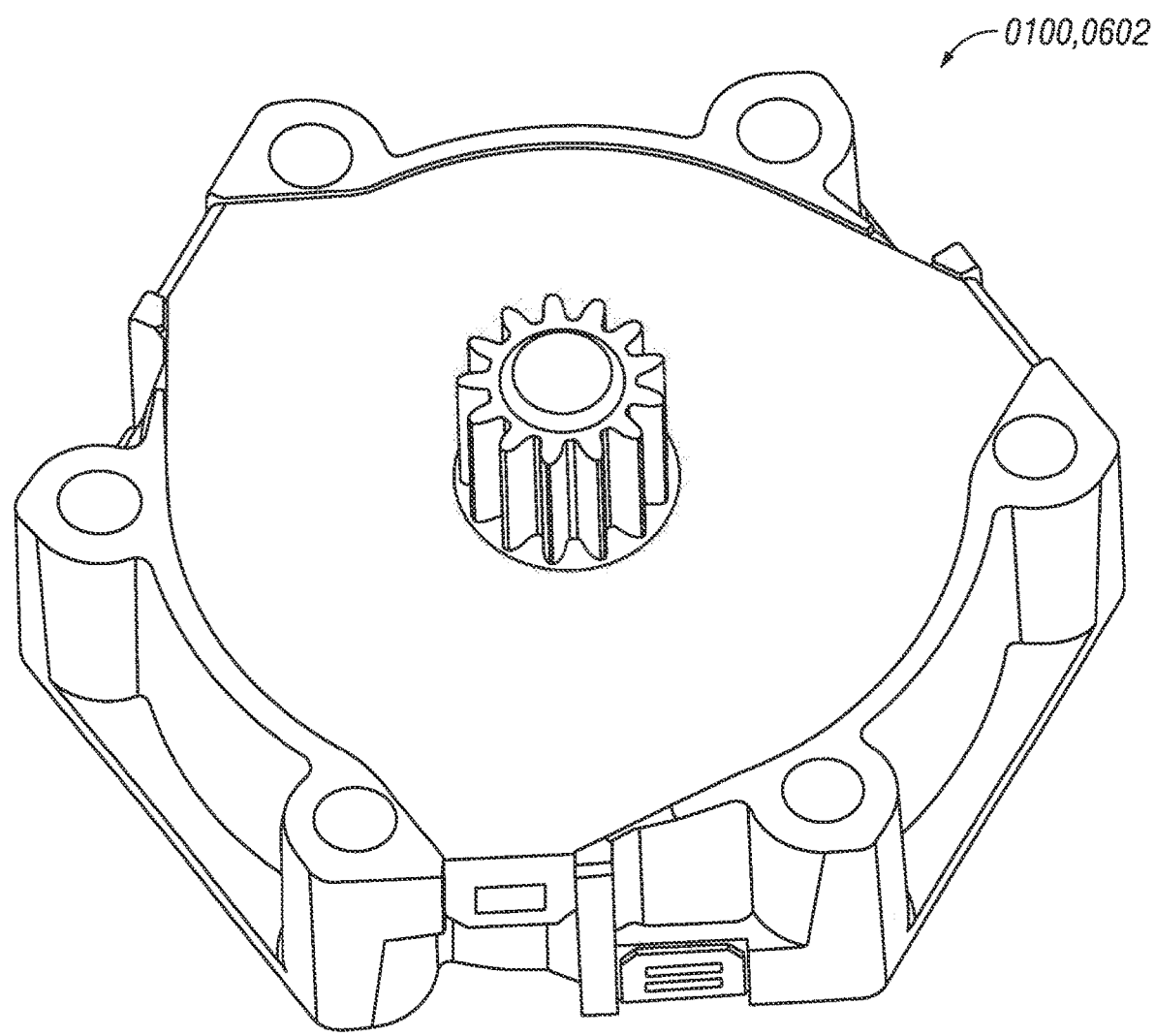
FIG. 3 is a perspective view taken from the top, rear and left of the modular gear transmission of FIG. 1, although FIG. 3 can also be an illustration of a perspective view taken from the top, rear and left of one embodiment of a modular gear transmission having a 4:1 gear ratio or a 5:1 gear ratio or any other gear ratio, which modular gear transmissions can look identical to the modular gear transmission having a 3:1 gear ratio when viewed from the top, front, rear, right and left, although modular gear transmissions having a different gear ratio can differ when viewed from the bottom due to differences in the shape of the transmission socket at the bottom of the modular gear transmission.
Figure 4:
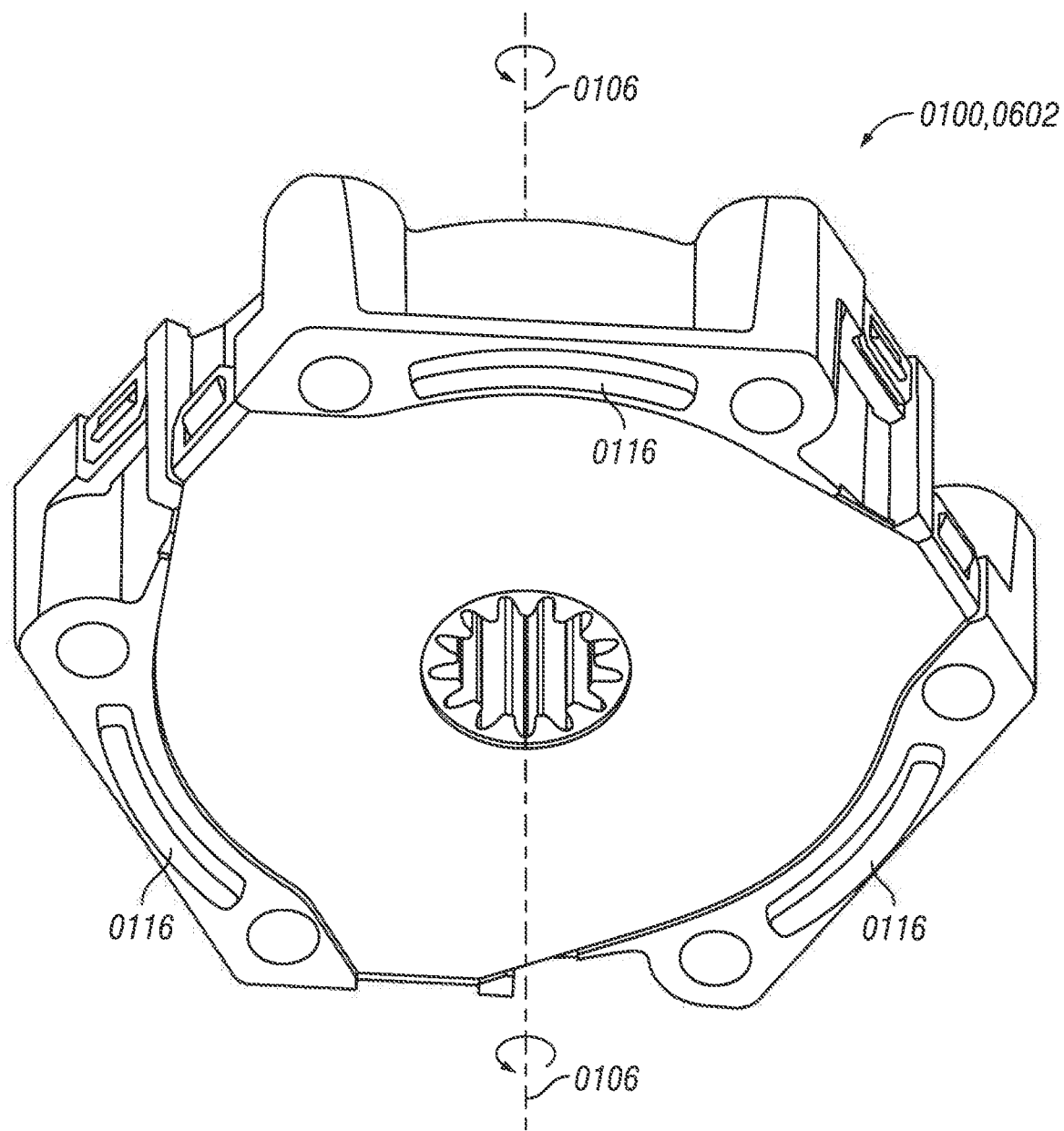
FIG. 4 is a perspective view taken from the bottom, front and right of the modular gear transmission of FIG. 1, although FIG. 4 can also be an illustration of a perspective view taken from the bottom, front and right of one embodiment of a modular gear transmission having a 4:1 gear ratio or a 5:1 gear ratio or any other gear ratio, depending on the configuration of the gears in the modular gear transmission.
Figure 5:
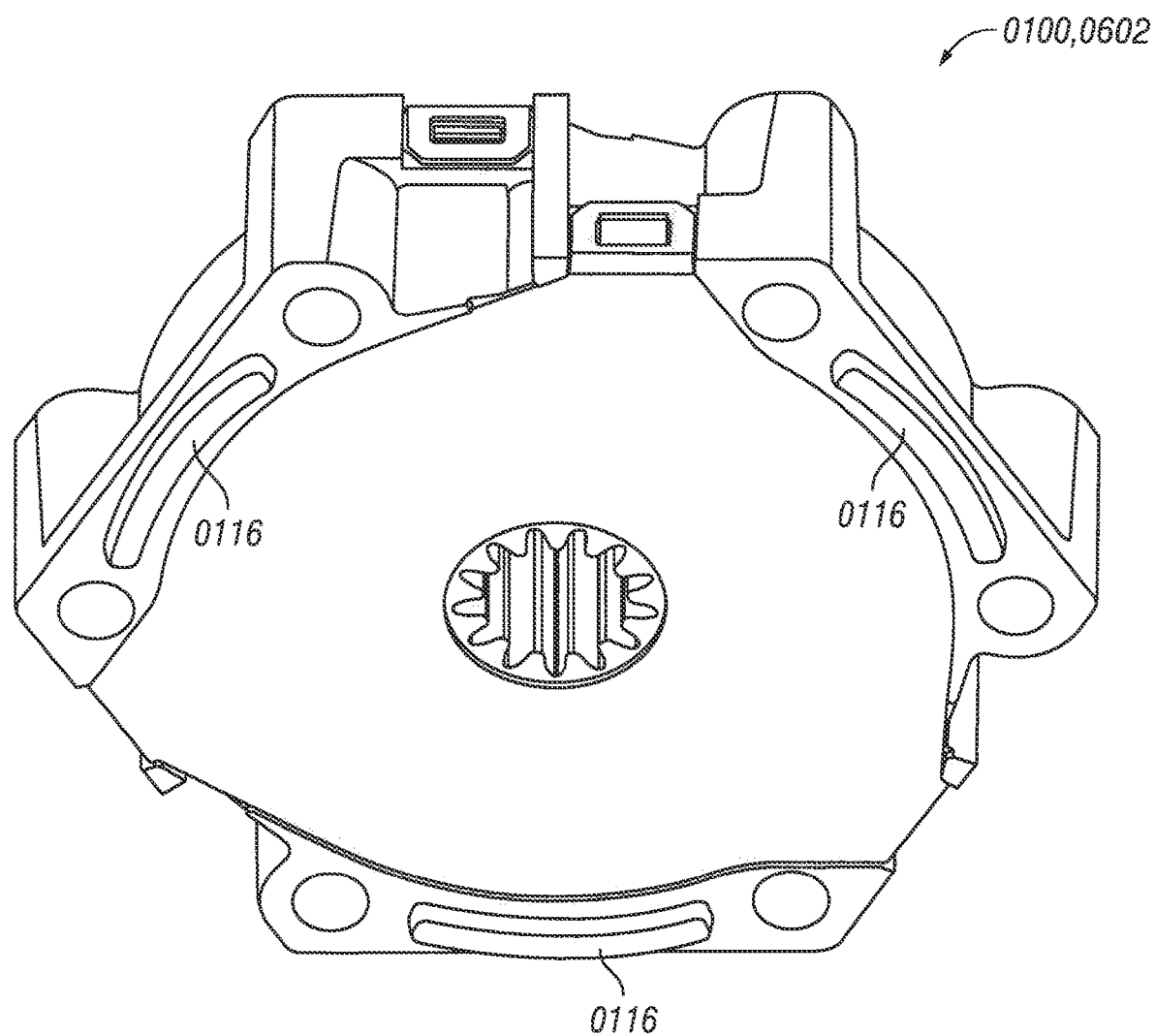
FIG. 5 is a perspective view taken from the bottom, rear and left of the modular gear transmission of FIG. 1, although FIG. 5 can also be an illustration a perspective view taken from the bottom, rear and left of one embodiment of a modular gear transmission having a 4:1 gear ratio or a 5:1 gear ratio or any other gear ratio, depending on the configuration of the gears in the modular gear transmission.

The first transmission gear set 1202 comprises a first protruding gear 0104 (e.g., as shown in FIG. 1 and FIG. 12, a first intermediate gear set 1204 comprising at least one intermediate transmission gear 1226 (e.g., as shown in FIG. 12), and a first transmission socket 0202 (e.g., as shown in FIG. 2 and FIG. 12, although the transmission socket can also be configured differently, for example, like the third transmission socket 1302 shown in FIG. 13).

The first transmission body 0102 is configured so that, when the modular gear transmission 0100 is in the assembled configuration, the first transmission body 0102 engages the first transmission gear set 1202 to hold the first transmission gear set 1202 in a rotatable configuration (e.g., as shown in the modular gear transmissions 0100, 0602, 0604, 0606 in FIG. 1 through FIG. 9).

The first protruding gear 0104 is configured so that, when the modular gear transmission 0100 is in the assembled configuration, the first protruding gear 0104 protrudes from the first transmission body 0102 and is directly or indirectly rotatably engaged with the first intermediate gear set 1204. The first protruding gear 0104 is configured to rotate around a first referential axis of rotation 0106. In some embodiments, the first protruding gear 0104 can be a planet carrier gear (e.g., as illustrated in FIG. 12). Optionally, when the modular gear transmission 0100 is in the assembled configuration, the first protruding gear 0104 is engaged by the first transmission body 0102 and thereby held in direct or indirect rotatable engagement with the first intermediate gear set 1204.

With reference to FIG. 2 and FIG. 12, the first transmission socket 0202 configured so that, when the modular gear transmission 0100 is in the assembled configuration, the first transmission socket 0202 is directly or indirectly rotatably engaged with the first intermediate gear set 1204, the first transmission socket 0202 is configured to rotatably engage a second protruding portion 0808 of a second protruding gear 1106 that is identical to a first protruding portion 0108 of the first protruding gear 0104.

Additionally, some embodiments of modular gear transmissions include various optional features. With reference to FIG. 8, the second protruding gear 1106 can be identical to the first protruding gear 0104.

With reference to FIG. 2 and FIG. 12, various optional features related to transmission sockets will now be described. The first transmission socket 0202 can be at least partly bounded by the first intermediate gear set 1204. The first transmission socket 0202 can be a void volume whose inner socket perimeter 0208 is at least partly defined by a plurality of gear teeth 0204 of the at least one intermediate transmission gear 1226. The first transmission socket 0202 can be a void volume whose inner socket perimeter 0208, 1308 (e.g., inner socket perimeter 0208 in FIG. 2, or inner socket perimeter 1308 along the dashed reference line in FIG. 13) is at least partly defined by a plurality of gear teeth (e.g., gear teeth 1304 in FIG. 13 or gear teeth 0204 in FIG. 2) of the at least one intermediate transmission gear 1226. With reference to FIG. 2 and FIG. 13, the gear teeth can be from one gear, two gears, three gears, four gears or a plurality of gears of the at least one intermediate transmission gear 1226. In some embodiments, the first transmission socket (e.g., transmission socket 1302 in FIG. 13) can be a void volume whose inner socket perimeter (e.g., inner socket perimeter 1308 in FIG. 13) is at least partly defined by at least one planetary gear of a planetary gear set (e.g., planetary gears 1006, 1008, 1010, 1012 of FIG. 13 and FIG. 10). The first transmission socket 0202 can be a void volume whose inner socket perimeter 1308 is at least partly defined by a sun gear 1102 of a planetary gear set (e.g., as illustrated in FIG. 9, FIG. 11 and FIG. 12).

With reference again to FIG. 12, various optional features related to transmission gear sets will now be described. In some embodiments, the first transmission gear set 1202 comprises a planetary gear set. Optionally, the at least one transmission gear comprises at least one planetary gear of a planetary gear set (e.g., planetary gears 1206, 1208, 1210, 1212 of FIG. 12). In some embodiments, the at least one intermediate transmission gear 1226 comprises one planetary gear or a plurality of planetary gears (e.g., two planetary gears, three planetary gears or four planetary gears). The planetary gears can be configured to rotatably engage a ring gear 1224.

With further reference to FIG. 12, in some embodiments, the at least one intermediate transmission gear 1226 comprises a sun gear 1102. The sun gear 1102 can be configured to rotatably engage the at least one planetary gear of a planetary gear set (e.g., planetary gears 1206, 1208, 1210, 1212 of FIG. 12).

In some embodiments, the planetary gear set of a transmission gear set (e.g., the first transmission gear set 1202) comprises a planet carrier gear (which can be the first protruding gear 0104 illustrated in FIG. 1). The planet carrier gear can comprise a rotary disk 1214 directly or indirectly fixed to the protruding portion of the first protruding gear 0104. As illustrated in FIG. 12, the planet carrier gear can comprise at least one axle (e.g., axles 1216, 1218, 1220, 1222) for the at least one planetary gear, the at least one axle being fixed in immovable or rotatable relation to the rotary disk 1214.

With further reference to FIG. 12, in some embodiments, the planetary gear set of a transmission gear set (e.g., the first transmission gear set 1202) comprises at least one planetary gear (e.g., planetary gears 1206, 1208, 1210, 1212). Optionally, the planetary gear set comprises a ring gear 1224 configured to engage the at least one planetary gear (e.g., planetary gears 1206, 1208, 1210, 1212) and cause each gear in the at least one planetary gear to travel in an orbital path 1228 (e.g., circular path) along the interior of the ring gear 1224. In some embodiments, the planetary gear set comprises a sun gear 1102 (e.g., as illustrated in FIG. 11 or FIG. 12) configured to rotatably engage the at least one planetary gear (e.g., planetary gears 1206, 1208, 1210, 1212).

With reference to FIG. 12, in some embodiments, the first transmission gear set 1202 comprises a first protruding gear 0104 comprising a rotary disk 1214 immovably fixed in relation to the protruding portion 0108 of the protruding gear 0104 (e.g., as illustrated in FIG. 1). The rotary disk 1214 comprises at least one axle for the at least one intermediate transmission gear 1226 of the first transmission gear set 1202. For example, the at least one axle can be for at least one planetary gear of the planetary gear set (e.g., planetary gears 1206, 1208, 1210, 1212). Optionally, the at least one axle comprises an axle for each planetary gear in the planetary gear set.

With further reference to FIG. 12, in some embodiments, the first transmission gear set 1202 is configured so that rotation of the first protruding gear 0104 causes rotation of the rotary disk 1214. The rotation of the rotary disk 1214 causes revolution of the at least one axle of the rotary disk around the axis of rotation of the rotary disk. The revolution of the at least one axle of the rotary disk causes the at least one intermediate transmission gear 1226 (e.g., one planetary gear, two planetary gears, three planetary gears, or four planetary gears) to travel in an engaged rotary motion along the ring gear 1224 (e.g., inner ring inner socket perimeter of the ring gear 1224). Further, the engaged rotary motion of the at least one intermediate transmission gear 1226 causes each gear in the at least one intermediate transmission gear 1226 to rotate around the axle of the gear. In some embodiments, the at least one axle of the rotary disk 1214 can be one axle, two axles, three axles, four axles or each of the plurality of axles in the at least one axle of the rotary disk. In some embodiments, the at least one intermediate transmission gear 1226 can be at least one planetary gear or a plurality of planetary gears, or planetary gears 1206, 1208, 1210, 1212.

With reference to FIG. 2 and FIG. 12, in some embodiments, the at least one intermediate transmission gear 1226 forms a void that forms the first transmission socket 0202 or the at least one intermediate transmission gear 1226 rotatably engages a sun gear 1102 to cause the rotation of the sun gear 1102, and the sun gear 1102 comprises a void that forms the first transmission socket 0202;

With further reference to FIG. 12, in some embodiments, the first transmission gear set 1202 is configured so that the first protruding gear 0104 (e.g., planet carrier gear and its rotary disk 1214) is configured to rotate counter-clockwise around the first referential axis of rotation 0106 as viewed when facing the first protruding gear 0104 (e.g., the rotational direction shown in FIG. 1, FIG. 10, FIG. 11, and FIG. 12). Optionally, the first transmission gear set is configured so that the first protruding gear 0104 (e.g., planet carrier gear and its rotary disk 1214) is configured to rotate clockwise around the first referential axis of rotation 0106 as viewed when facing the first protruding gear 0104. For example, clockwise, is opposite the rotational direction shown in FIG. 1, FIG. 10, FIG. 11, and FIG. 12. In some embodiments, the first transmission gear set is configured so that the first protruding gear 0104 (e.g., planet carrier gear and its rotary disk 1214) is configured to rotate both counter-clockwise and clockwise around the first referential axis of rotation 0106 as viewed when facing the first protruding gear 0104.

With reference again to FIG. 12, the first transmission gear set 1202 can be configured so that the planetary gears rotate along their axes of rotation in a rotational direction that is opposite the rotational direction 0110 of the first protruding gear 0104 (e.g., as illustrated in FIG. 1, FIG. 10, FIG. 11, and FIG. 12).

As illustrated in FIG. 12, the first transmission gear set 1202 can be configured so that the planetary gears travel in an orbital path 1228 (e.g., circular path) along the interior of the ring gear 1224 that is in the same direction as the rotational direction 0110 of the first protruding gear 0104 (e.g., as illustrated in FIG. 1, FIG. 10, FIG. 11, and FIG. 12).

Furthermore, as illustrated in FIG. 12, the first transmission gear set 1202 can be configured so that a protruding gear that is rotatably engaged with the first transmission socket 0202 will rotate in the same direction as the rotational direction 0110 of the first protruding gear 0104 (e.g., as illustrated in FIG. 1, FIG. 10, FIG. 11, and FIG. 12).

As will be evident to a skilled person reviewing the present disclosure, the modular gear transmission 0100 can be configured so that when the first protruding gear 0104 rotates at a first rotational velocity and when the first transmission socket 0202 is rotatably engaged with the second protruding gear 1106, then the second protruding gear 1106 rotates at a second rotational velocity. Optionally, the ratio of the first rotational velocity to the second rotational velocity is fixed. In some embodiments, the ratio of the first rotational velocity to the second rotational velocity is greater than 1:1 (e.g., 5:1, 4:1, 3:1, or 2:1), 1:1, or less than 1:1 (e.g., 1:2, 1:3, 1:4, or 1:5).

As illustrated in FIG. 10, FIG. 11, or FIG. 12, the modular gear transmission 0100 can be configured to have a disengaged configuration in which the first transmission body 0102 disengages the first transmission gear set 1202 to enable the first transmission gear set 1202 (or first intermediate gear set 1204) to be replaced with an alternate transmission gear set. In some embodiments, the modular gear transmission 0100 is configured to have a disengaged configuration in which the first transmission body 0102 disengages the first intermediate gear set 1204 to enable the first intermediate gear set 1204 to be replaced with an alternate intermediate gear set. For example, the alternate transmission gear set can be configured so that the modular gear transmission 0100 can be placed in an alternate assembled configuration in which (i) the first transmission body 0102 engages the alternate transmission gear set to hold the alternate transmission gear set in a rotatable configuration, (ii) the first protruding gear 0104 protrudes from the first transmission body 0102 and is directly or indirectly rotatably engaged with an alternate intermediate gear set of the alternate transmission gear set, and (iii) the alternate transmission socket is directly or indirectly rotatably engaged with the alternate intermediate gear set, the alternate transmission socket being configured to rotatably engage a second protruding gear 1106 that is identical to the first protruding gear 0104.

Turning now to FIG. 1 and FIG. 12, an example of a transmission body (e.g., the first transmission body 0102) will be described. As illustrated in FIG. 12, the transmission body 0102 comprises a first containment wall 1230, a first protrusion-end plate 1232, and a first socket-end plate 1234.

As illustrated in FIG. 12, in some embodiments, the first transmission body 0102 comprises a ring gear 1224. For example, in some embodiments, the first containment wall 1230 has a first inner surface that is the inner surface of the ring gear 1224 and the ring gear has a ring gear central axis that is coaxial with the first referential axis of rotation 0106 of the first protruding gear 0104. As illustrated, the ring gear 1224 can have ring gear teeth 1236 that face inwardly, for example, toward the first referential axis of rotation 0106. Furthermore, the ring gear 1224 can have ring gear teeth 1236 that directly or indirectly engage teeth of another gear or other gears of the at least one intermediate transmission gear 1226 (e.g., at least one planetary gear, or planetary gears 1206, 1208, 1210, 1212).

Turning again to FIG. 12, in some embodiments, the first containment wall 1230 comprises at least one alignment socket 0112, the at least one alignment socket 0112 comprising an alignment socket 0112 configured to receive an alignment element 0802 that engages the alignment socket 0112 to register the alignment socket 0112 into a desired position relative to a first reference point on a connected object. For example, with reference to FIG. 8, the first reference point can be any reference point on a connected driver, connected output gear transmission, or connected modular gear transmission. In some embodiments, the at least one alignment socket 0112 has an alignment socket central axis 0114 that is parallel with the first referential axis of rotation 0106. Optionally, the at least one alignment socket 0112 comprises a plurality of alignment sockets, each alignment socket in the plurality of alignment sockets being configured to register the alignment socket into a desired position relative to a first reference point on a connected object (e.g., any reference point on a connected driver 0608, connected output gear transmission, or connected modular gear transmission, for example, as illustrated in FIG. 8). As can be seen, each alignment socket in the at least one alignment socket 0112 can be configured to restrict the motion of the containment wall to rotation about the alignment socket central axis 0114, for example, so that two or more alignment sockets can be used to prevent the modular gear transmission from rotating or moving in any direction except sliding along the two or more alignment sockets.

With reference to FIG. 9 and FIG. 12, in some embodiments, the first containment wall 1230 of a first modular gear transmission 00602 comprises at least one wall protrusion 0116 (e.g., 1, 2, or 3 or more protrusions, for example, as illustrated in FIG. 9 and FIG. 12), and each protrusion is configured to extend between two alignment sockets 0112 of a second modular gear transmission 0604 engaged with the first modular gear transmission 0602, thereby preventing the second modular gear transmission 0604 from rotating by more than 5, 4, 3, 2 or 1 degrees relative to the first modular gear transmission 0602. An example of how a wall protrusion 0116 can engage alignment sockets 0112 as illustrated in FIG. 6 through FIG. 9. As illustrated, the at least one wall protrusion 0116 can extend from the first containment wall 1230 adjacent to the first socket-end plate 1234. Further, in some embodiments, the at least one wall protrusion 0116 extends distally and past the first socket-end plate 1234 as measured along the first referential axis of rotation 0106.

In some embodiments, a transmission body (e.g., the first transmission body 0102) comprises a first protrusion-end plate 1232. The first protrusion-end plate 1232 can be configured to engage and disengage the first containment wall 1230, thereby providing access to replace the first transmission gear set 1202, the first protruding gear 0104, the first intermediate gear set 1204, the first transmission socket 0202, or a combination thereof. Optionally, the first protrusion-end plate 1232 comprises a first protrusion aperture 1238 configured to permit the first protruding gear 0104 to protrude through the first protrusion aperture 1238. As illustrated in FIG. 12, the first referential axis of rotation 0106 can pass through the first protrusion aperture 1238.

In some embodiments, a transmission body (e.g., the first transmission body 0102) comprises a first socket-end plate 1234. The first socket-end plate 1234 can be configured to engage and disengage the first containment wall 1230, thereby providing access to replace the first protruding gear 0104, the first transmission gear set 1202, the first transmission socket 0202, or a combination thereof. As illustrated in FIG. 12, the first socket-end plate 1234 comprises a first socket aperture 1240 configured to permit the second protruding gear 1106 to protrude through the first socket aperture 1240 to engage the first transmission socket 0202. Additionally, as illustrated in FIG. 12, in some embodiments the first referential axis of rotation 0106 passes through the first socket aperture 1240.

With reference now to FIG. 6, a system 0600 comprising a plurality of modular gear transmissions is depicted. As can be seen, the plurality of modular gear transmission can be connected in series. As illustrated the system 0600 comprises a modular gear transmission 0100 as described herein (which can be referred to as a first modular gear transmission 0602) and a second modular gear transmission 0604 rotatably engaged with the first modular gear transmission 0602.

The first modular gear transmission 0602 can be a modular gear transmission with a 3:1 gear ratio as illustrated in the first modular gear transmission 0602 in FIG. 1 through FIG. 9 and FIG. 12. Although, the first modular gear transmission 0602 having a 3:1 gear ratio can also be replaced with a modular gear transmission with any desired gear ratio. For example, the first modular gear transmission 0602 can be replaced with a modular gear transmission with a 4:1 gear ratio as illustrated in the second modular gear transmission 0604 in FIG. 6 though FIG. 9 and FIG. 11. Additionally, the first modular gear transmission 0602 can be replaced with or a modular gear transmission with a 5:1 gear ratio as illustrated in the third modular gear transmission 0606 in FIG. 6 through FIG. 10.

With reference again to the system of FIG. 6, the second modular gear transmission 0604 is rotatably engaged with the first modular gear transmission 0602, and the second modular gear transmission 0604 has a second assembled configuration (e.g., as illustrated in FIG. 6). Furthermore, the second modular gear transmission 0604 comprises a second transmission body 0804 and a second transmission gear set 1104 as illustrated in FIG. 11.

With reference to FIG. 11, the second transmission gear set 1104 can comprise a second protruding gear 1106, a second intermediate gear set 1108 comprising at least one intermediate transmission gear 1226, and a second transmission socket 0902.

With reference again to FIG. 11, the second transmission body 0804 can be configured so that, when the second modular gear transmission 0604 is in the second assembled configuration, the second transmission body 0804 engages the second transmission gear set 1104 to hold the second transmission gear set 1104 in a rotatable configuration.

With further reference to FIG. 11, the second protruding gear 1106 can be configured so that, when the second modular gear transmission 0604 is in the second assembled configuration, the second protruding gear 1106 protrudes from the second transmission body 0804 and is directly or indirectly rotatably engaged with the second intermediate gear set 1108. Additionally, the second protruding gear 1106 can be configured to rotate around a second referential axis of rotation, which can be coaxial with the first referential axis of rotation 0106.

With reference to FIG. 8, FIG. 9 and FIG. 11, the second transmission socket 0902 can be configured so that, when the second modular gear transmission 0604 is in the second assembled configuration, the second transmission socket 0902 is directly or indirectly rotatably engaged with the second intermediate gear set 1108. Additionally, the second transmission socket 0902 can be configured to rotatably engage a third protruding portion 0810 of a third protruding gear 1014 that is identical to a second protruding portion 0808 of the second protruding gear 1106, a first protruding portion 0108 of the first protruding gear 0104, or a combination thereof. Optionally the third protruding gear 1014 is identical to the second protruding gear 1106, the first protruding gear 0104, or a combination thereof.

As a skilled person would understand upon reading this disclosure, not every feature described in this disclosure with respect to the modular gear transmission 0100 or the first modular gear transmission 0602 has been repeated while describing the second modular gear transmission 0604. Nonetheless, these features can also be included in the second modular gear transmission in addition to or in place of features expressly described in the second modular gear transmission 0604. Accordingly, in some embodiments, the second modular gear transmission 0604 comprises an analogous or identical component for any component that is included or that can be included in the modular gear transmission 0100 or the first modular gear transmission 0602. Furthermore, in some embodiments, the second modular gear transmission 0604 comprises an analogous or identical sub-component for any sub-component that is included or that can be included in the modular gear transmission 0100 or the first modular gear transmission 0602. Moreover, in some embodiments, the second modular gear transmission 0604 comprises an analogous or identical characteristic for any characteristic that is included or that can be included in the modular gear transmission 0100 or the first modular gear transmission 0602.

With reference again to the system 0600 of FIG. 6, the system 0600 can comprise a third modular gear transmission 0606. The third modular gear transmission 0606 can be rotatably engaged with the second modular gear transmission 0604 (e.g., as illustrated in FIG. 6 through FIG. 9), and the third modular gear transmission 0606 can have a third assembled configuration (e.g., as illustrated in FIG. 6 through FIG. 9). Additionally, the third modular gear transmission 0606 can comprise a third transmission body 0806, and a third transmission gear set 1002.

With reference to FIG. 10, the third transmission gear set 1002 can comprise a third protruding gear 1014, a third intermediate gear set 1004 comprising at least one intermediate transmission gear, and a third transmission socket 0904.

With reference again to FIG. 10, the third transmission body 0806 can be configured so that, when the third modular gear transmission 0606 is in the third assembled configuration, the third transmission body 0806 engages the third transmission gear set 1002 to hold the third transmission gear set 1002 in a rotatable configuration.

With further reference to FIG. 10, the third protruding gear 1014 can be configured so that, when the third modular gear transmission 0606 is in the third assembled configuration, the third protruding gear 1014 protrudes from the third transmission body 0806 and is directly or indirectly rotatably engaged with the third intermediate gear set 1004, the third protruding gear 1014 configured to rotate around a third referential axis of rotation, which can be coaxial with the first referential axis of rotation 0106.

With reference to FIG. 8, FIG. 9 and FIG. 10, the third transmission socket 0904 configured so that, when the third modular gear transmission 0606 is in the third assembled configuration, the third transmission socket 0904 is directly or indirectly rotatably engaged with the third intermediate gear set 1004. Additionally, the third transmission socket 0904 can be configured to rotatably engage a fourth protruding portion of a fourth protruding gear that is identical to a third protruding portion 0810 of the third protruding gear 1014, a second protruding portion 0808 of the second protruding gear 1106, a first protruding portion 0108 of the first protruding gear 0104, or a combination thereof. Optionally the fourth protruding gear is identical to the third protruding gear 1014, the second protruding gear 1106, the first protruding gear 0104 or a combination thereof.

As a skilled person would understand upon reading this disclosure, not every feature described in this disclosure with respect to the modular gear transmission 0100 or the first modular gear transmission 0602 has been repeated while describing the third modular gear transmission 0606. Nonetheless, these features can also be included in the third modular gear transmission in addition to or in place of features expressly described in the third modular gear transmission 0604. Accordingly, in some embodiments, the third modular gear transmission 0606 comprises an analogous or identical component for any component that is included or that can be included in the modular gear transmission 0100 or the first modular gear transmission 0602. Furthermore, in some embodiments, the third modular gear transmission 0606 comprises an analogous or identical sub-component for any sub-component that is included or that can be included in the modular gear transmission 0100 or the first modular gear transmission 0602. Moreover, in some embodiments, the third modular gear transmission 0606 comprises an analogous or identical characteristic for any characteristic that is included or that can be included in the modular gear transmission 0100.

With reference again to FIG. 6, in some embodiments a modular gear transmission system 0600 comprises a plurality of modular gear transmissions, for example, two, three, four, five, six, seven, eight, nine, ten or more modular gear transmissions 0100. In some embodiments, the plurality of modular gear transmissions can comprise the modular gear transmission 0100 (or the first modular gear transmission 0602), the second modular gear transmission 0604, the third modular gear transmission 0606, or a combination thereof. In some embodiments, each modular gear transmission 0100 in the plurality of modular gear transmissions is configured to rotatably engage any of the other modular gear transmissions 0100 in the plurality of modular gear transmissions. Optionally, the modular gear transmissions 0100 are all configured so that each of the modular gear transmissions 0100 can be interposed between and directly rotatably engage a driver 0608 and any of the other modular gear transmissions 0100 while the driver 0608 rotates the gears of the modular gear transmissions 0100. Additionally, in some embodiments, each modular gear transmission 0100 in the plurality of modular gear transmissions is configured to be connected to a driver 0608 by any of the other modular gear transmissions 0100 in the plurality of modular gear transmissions while the driver 0608 rotates the gears of the modular gear transmissions 0100.

With reference to FIG. 6, in some embodiments of a modular gear transmission system 0600, a plurality of modular gear transmissions 0100 are connected and rotatably engaged to provide an overall rotational velocity ratio, the overall rotational velocity ratio being the ratio of the rotational velocity of a driver 0608 to the rotational velocity of a driven component. For example, as illustrated in FIG. 6, the driver 0608 is directly connected to a modular gear transmission 0100 at a first end 0610 of the plurality of modular gear transmissions, and the driven component is directly connected to a modular gear transmission 0100 at a second end 0612 of the plurality of modular gear transmissions. With reference to FIG. 6, the second end 0612 of the plurality of modular gear transmissions is opposite the first end 0610 of the plurality of modular gear transmissions. As an example, the plurality of modular gear transmissions can comprise the first modular gear transmission 0602, the second modular gear transmission 0604, and the third modular gear transmission 0606 as illustrated in FIG. 6, FIG. 8 and FIG. 9.

With further reference to FIG. 6, the modular gear transmission system 0600 can comprise a driver 0608. Furthermore, in some embodiments, the driver 0608 is configured to be directly or indirectly rotatably engaged with the modular gear transmission 0100 (or the first modular gear transmission 0602), the second modular gear transmission 0604, the third modular gear transmission 0606, or the last modular gear transmission 0100 in a plurality of modular gear transmissions. For example, with reference to FIG. 8 and FIG. 9, the driver 0608 can be configured to engage the first transmission socket 0202, the second transmission socket 0902, the third transmission socket 0904, or the transmission socket of the last modular gear transmissions 0100 in a plurality of modular gear transmissions.

Additionally, as illustrated in FIG. 8 and FIG. 9, the driver 0608 can comprise a driver protrusion-end surface 0812 and the system 0600 can comprise a driver protrusion-end plate 0814 configured to be fixed to the driver 0608 and the modular gear transmission 0100 (or the first modular gear transmission 0602), the second modular gear transmission 0604, the third modular gear transmission 0606, or the last modular gear transmission 0100 in a plurality of modular gear transmissions. Optionally the driver protrusion-end plate 0814 is configured to immobilize the driver protrusion-end surface 0812 relative to the modular gear transmission 0100 (or the first modular gear transmission 0602), the second modular gear transmission 0604, the third modular gear transmission 0606, or the last modular gear transmission 0100 in a plurality of modular gear transmissions.

With reference again to FIG. 8 and FIG. 9, in some embodiments, the driver protrusion-end surface 0812 is configured to be directly fixed to the modular gear transmission 0100 (or the first modular gear transmission 0602), the second modular gear transmission 0604, the third modular gear transmission 0606, or the last modular gear transmission 0100 in a plurality of modular gear transmissions. Optionally, the driver protrusion-end surface 0812 is configured to immobilize the driver protrusion-end surface 0812 relative to the modular gear transmission 0100 (or the first modular gear transmission 0602), the second modular gear transmission 0604, the third modular gear transmission 0606, or the last modular gear transmission 0100 in a plurality of modular gear transmissions.

In some embodiments, the system 0600 comprises an output gear transmission 0816 comprising an output gear set (e.g., as illustrated in FIG. 8). The output gear transmission 0816 set comprises at least one output transmission gear.

With reference to FIG. 8, the output gear transmission 0816 can be a female output gear transmission 0816. As a skilled person would understand upon reading this disclosure, the output gear transmission 0816 can be configured to be directly or indirectly rotatably engaged with a driven component (e.g., a driven component having a male connection to the female output gear transmission or a driven component having a female connection if the output gear is a male output gear transmission).

With reference to FIG. 8, the output gear transmission 0816 can be configured to engage the protruding gear of the modular gear transmission 0100 or the first protruding gear 0104 of the first modular gear transmission 0602 in a plurality of modular gear transmissions. Optionally, the output gear transmission 0816 comprises an output gear body 0818 configured to engage the output gear set of the output gear transmission 0816 to hold the output gear set in a rotatable configuration. Additionally, the output gear set can have at least one output gear configured to be directly or indirectly rotatably engaged with a driven component that is driven by the driver. Furthermore, the at least one output gear can be configured to be directly or indirectly rotatably engaged with a modular gear transmission or the first modular gear transmission in a plurality of modular gear transmissions that are connected in series. Optionally, the output gear body 0818 comprises at least one alignment socket 0112, the at least one alignment socket 0112 configured to receive an alignment element 0802 that engages the alignment socket to register the alignment socket into a desired position relative to the first transmission body 0102.

Also, although the system 0600 of FIG. 8 illustrates a driver having a protruding male gear that connects to a modular gear transmission (or the last modular gear transmission in a plurality of modular gear transmissions) and although FIG. 8 illustrates the output gear as having a recessed female gear that connects to the modular gear transmission (or the first modular gear transmission in a plurality of modular gear transmissions), this could be reversed in some embodiments. For example, the driver can comprise a recessed female gear that connects to a modular gear transmission or the last modular gear transmission in a plurality of modular gear transmissions and the output gear can have a protruding male gear that connects to the modular gear transmission or the first modular gear transmission in a plurality of modular gear transmissions. Accordingly, each modular gear transmission can remain in the same order and be reversed, for example, so that the last transmission socket (e.g., 0904 in FIG. 9) is configured to rotatably engage a second protruding portion 0808 of a second protruding gear 1106 that is identical to a third protruding portion 0810 of the third protruding gear 1014, so that the adjacent transmission socket (e.g., 0902 in FIG. 9) of a modular gear transmission is configured to rotatably engage a first protruding portion 0108 of a first protruding gear 0104 that is identical to a second protruding portion 0808 of the second protruding gear 1106. As a skilled person would understand upon reading this disclosure, the last modular gear transmission can also be the first modular gear transmission if only one modular gear transmission is used. Alternatively, the modular gear transmission that is adjacent to the last modular gear transmission can be the first modular gear transmission if only one modular gear transmission is used. Additionally, rather than reversing each modular gear transmission in a plurality of connected modular gear transmissions, the entire plurality of connected modular gear transmissions can be reversed as a combination, noting that the gear ratio for each individual gear will be inverted (e.g., from 5:1 to 1:5) for each gear that is reversed relative to the driver, and the gear ratio of a plurality of connected modular gear transmissions will be inverted (e.g., from 60:1 to 1:60, for a plurality of connected gear transmissions that are reversed as a combination. Accordingly, in some embodiments, it can be desirable to use different modular gear transmissions, rather than simply reversing the modular gear transmissions, when using modular gear transmissions with drivers having female versus male connections to a modular gear transmission.

With reference now to FIG. 8, the modular gear transmission system 0600 can comprise an alignment element 0802 (e.g., fastener, screw, bolt, or rod) configured to pass through an alignment socket of the output gear body 0818, the first transmission body 0102, the second transmission body 0804, the third transmission body 0806, the fourth transmission body, a plurality of transmission bodies in a plurality of modular gear transmissions, the driver protrusion-end plate 0814, the driver protrusion-end surface 0812, the driver 0608 or a combination thereof. In some embodiments, the modular gear transmission system 0600 can comprise a plurality of alignment elements 0802 (e.g., fasteners, screws, bolts, rods), and each alignment element 0802 in the plurality of alignment elements 0802 is configured to pass through an alignment socket 0112 of the output gear body 0818, the first transmission body 0102, the second transmission body 0804, the third transmission body 0806, the fourth transmission body, a plurality of transmission bodies in a plurality of modular gear transmissions, the driver protrusion-end plate 0814, the driver protrusion-end surface 0812, the driver 0608 or a combination thereof.

In some embodiments, the modular gear transmission system 0600 comprises a driven component. In some embodiments, the driven component is configured to engage the output gear transmission 0816. For example, the output gear transmission 0816 can be a female output gear transmission 0816, and the driven component can have a connector shaped like the protruding portion of a protruding gear or the driver. Alternatively, the output gear transmission 0816 can be a male output gear transmission 0816, and the driven component can be configured to engage a male output gear transmission (e.g., having a connector shaped like the transmission socket 0202, 0902, 0904 of a modular gear transmission).

Optionally, in some embodiments, the driven component is configured to engage a protruding gear of the modular gear transmission 0100 or the first protruding gear 0104 of the first modular gear transmission 0602 in a plurality of modular gear transmissions, the driver, the output gear transmission or a combination thereof. For example, the driven component can have a connector shaped like the transmission socket 0202, 0902, 0904 of a modular gear transmission.

As a skilled person would understand any suitable material and size can be used for the modular gear transmission, component of a modular gear transmission, subcomponent of a component of a modular gear transmission, system comprising a modular gear transmission, component of a system comprising a modular gear transmission, or subcomponent of a component of a system comprising a modular gear transmission. In some embodiments, suitable materials include metals and polymers. For example, any containment wall (e.g., the first containment wall 1230) can comprise or consist of a polymer. As another example, any protrusion end-plate (e.g., the first protrusion-end plate 1232), any socket-end plate (e.g. the first socket-end plate 1234), or any gears (e.g., gears in the first transmission gear set 1202) can comprise or consist of a metal, metals, or metal alloy. In some embodiments, each protrusion end-plate (e.g., the first protrusion-end plate 1232) and each socket-end plate (e.g. the first socket-end plate 1234), can be identical. In some embodiments, each protrusion end-plate (e.g., the first protrusion-end plate 1232) and each socket-end plate (e.g. the first socket-end plate 1234) are made from a flexible material that enables the a tab to be folded at a right angle to a remainder of the protrusion end-plate or the socket-end plate, the tab having an aperture so that a protruding portion of any containment wall (e.g., the first containment wall 1230) can be inserted into the tab. Optionally, each protrusion end-plate (e.g., the first protrusion-end plate 1232) and each socket-end plate (e.g. the first socket-end plate 1234) comprises three tabs, each tab being folded and having an aperture so that a protruding portion of any containment wall (e.g., the first containment wall 1230) can be inserted into the tab, thereby securing each protrusion end-plate (e.g., the first protrusion-end plate 1232) and each socket-end plate (e.g. the first socket-end plate 1234) to a corresponding containment wall (e.g., the first containment wall 1230). In some embodiments, the gears are made of a hard, durable metal that does not significantly bend and does not fracture under the forces expected to be applied to the gears in operation so as to maintain the desired fixed gear ratio of any modular gear transmission or any system comprising a modular gear transmission.

In some embodiments, a modular gear transmission 0100, 0602, 0604, 0606 has a maximum diameter or length (in a direction perpendicular to the referential axis of rotation for the protruding gear) equal to 1.5 inches+/−50%, 40%, 30%, 25%, 20%, 15%, 10%, 5%, 4%, 3%, 2%, or 1%. As used in this context, the length is the longest distance between two points that are each on an outer surface of the modular gear transmission and each located in a plane perpendicular to the referential axis of rotation for the protruding gear. In some embodiments, a modular gear transmission 0100, 0602, 0604, 0606 has a maximum width (in a direction that is perpendicular to the referential axis of rotation for the protruding gear and perpendicular to the length) equal to 1.5 inches+/−50%, 40%, 30%, 25%, 20%, 15%, 10%, 5%, 4%, 3%, 2%, or 1%. In some embodiments, a modular gear transmission 0100, 0602, 0604, 0606 has a height (in a direction that is parallel to the referential axis of rotation for the protruding gear) equal to 0.7 inches+/−50%, 40%, 30%, 25%, 20%, 15%, 10%, 5%, 4%, 3%, 2%, or 1%. In some embodiments, a containment wall (e.g., the first containment wall 1230) of the modular gear transmission has a height (in a direction that is parallel to the referential axis of rotation for the protruding gear) equal to 0.35 inches+/−50%, 40%, 30%, 25%, 20%, 15%, 10%, 5%, 4%, 3%, 2%, or 1%. In some embodiments, a protruding portion of a protruding gear (e.g., first protruding gear 0104) that protrudes beyond the containment wall (e.g., the first containment wall 1230) of the modular gear transmission has a maximum height (in a direction that is parallel to the referential axis of rotation for the protruding gear) equal to 0.35 inches+/−50%, 40%, 30%, 25%, 20%, 15%, 10%, 5%, 4%, 3%, 2%, or 1%. In some embodiments, a protruding portion of a protruding gear (e.g., first protruding gear 0104) that protrudes beyond the transmission body (e.g., the first transmission body 0102 of the modular gear transmission has a height (in a direction that is parallel to the referential axis of rotation for the protruding gear) equal to 0.35 inches+/−50%, 40%, 30%, 25%, 20%, 15%, 10%, 5%, 4%, 3%, 2%, or 1%. Accordingly, in some embodiments the modular gear transmission can be relatively compact individually and when assembled into a system comprising a series of rotatably engaged modular gear transmissions.

In some embodiments, two modular gear transmissions that are assembled in series and rotatably engaged with each other have the same length, width and height as either one or both of the modular gear transmissions to within a tolerance of +/−50%, 40%, 30%, 25%, 20%, 15%, 10%, 5%, 4%, 3%, 2%, or 1% with respect to the length, the width, the height or a combination thereof.

Additional Embodiments

The following clauses include descriptive embodiments that are offered as further disclosure of embodiments of modular gear transmissions and associated systems. Although drawing reference numbers are included in this Additional Embodiments section, these drawing reference numbers provide examples of the elements recited in this section, but do not limit the features illustrated by the drawing reference numbers.

1. A modular gear transmission 0100 having an assembled configuration (e.g., as illustrated in FIG. 1 through FIG. 13 by the modular gear transmission 0606 having a 5:1 gear ratio, the modular gear transmission 0604 having a 4:1 gear ratio, or the modular gear transmission 0602 having a 3:1 gear ratio), the modular gear transmission 0100 comprising:

a first transmission body 0102, and a first transmission gear set 1202 (e.g., as shown in FIG. 12);

the first transmission gear set 1202 comprising:

a first protruding gear 0104 (e.g., as shown in FIG. 1 and FIG. 12), a first intermediate gear set 1204 comprising at least one intermediate transmission gear 1226 (e.g., as shown in FIG. 12), and a first transmission socket 0202 (e.g., as shown in FIG. 2 and FIG. 12, although the transmission socket can also be configured differently, for example, like the third transmission socket 1302 shown in FIG. 13);

the first transmission body 0102 configured so that, when the modular gear transmission 0100 is in the assembled configuration, the first transmission body 0102 engages the first transmission gear set 1202 to hold the first transmission gear set 1202 in a rotatable configuration (e.g., as shown in the modular gear transmissions 0100, 0602, 0604, 0606 in FIG. 1 through FIG. 9);

the first protruding gear 0104 configured so that, when the modular gear transmission 0100 is in the assembled configuration, the first protruding gear 0104 protrudes from the first transmission body 0102 and is directly or indirectly rotatably engaged with the first intermediate gear set 1204, the first protruding gear 0104 configured to rotate around a first referential axis of rotation 0106;

optionally the first protruding gear 0104 is a planet carrier gear (e.g., as illustrated in FIG. 12), optionally when the modular gear transmission 0100 is in the assembled configuration, the first protruding gear 0104 is engaged by the first transmission body 0102 and thereby held in direct or indirect rotatable engagement with the first intermediate gear set 1204;

the first transmission socket 0202 configured so that, when the modular gear transmission 0100 is in the assembled configuration, the first transmission socket 0202 is directly or indirectly rotatably engaged with the first intermediate gear set 1204, the first transmission socket 0202 being configured to rotatably engage a second protruding portion 0808 of a second protruding gear 1106 that is identical to a first protruding portion 0108 of the first protruding gear 0104; and optionally the second protruding gear 1106 is identical to the first protruding gear 0104, optionally the first transmission socket 0202 is at least partly bounded by the first intermediate gear set 1204, optionally the first transmission socket 0202 is a void volume whose inner socket perimeter 0208 is at least partly defined by a plurality of gear teeth 0204 of the at least one intermediate transmission gear 1226, optionally the first transmission socket 0202 is a void volume whose inner socket perimeter 0208, 1308 (e.g., 0208 along inner socket perimeter 0208 in FIG. 2, or inner socket perimeter 1308 along the dashed reference line in FIG. 13) is at least partly defined by a plurality of gear teeth (e.g., gear teeth 1304 in FIG. 13 or gear teeth 0204 in FIG. 2) from one gear, two gears, three gears, or four gears of the at least one intermediate transmission gear 1226, optionally wherein the first transmission socket (e.g., transmission socket 1302 in FIG. 13) is a void volume whose inner socket perimeter (e.g., inner socket perimeter 1308 in FIG. 13) is at least partly defined by at least one planetary gear (e.g., planetary gears 1006, 1008, 1010, 1012 of FIG. 13 and FIG. 10) of a planetary gear set, optionally wherein the first transmission socket 0202 is a void volume whose inner socket perimeter 1308 is at least partly defined by a sun gear 1102 of a planetary gear set (e.g., as illustrated in FIG. 9, FIG. 11 and FIG. 12).

2. The modular gear transmission of any preceding clause, the modular gear transmission comprising at least one feature selected from the following group of features:

optionally the first transmission gear set 1202 comprises a planetary gear set, optionally wherein the at least one transmission gear comprises at least one planetary gear (e.g., planetary gears 1206, 1208, 1210, 1212 of FIG. 12) of a planetary gear set, optionally wherein the at least one intermediate transmission gear 1226 comprises one planetary gear or a plurality of planetary gears (e.g., two planetary gears, three planetary gears or four planetary gears), optionally wherein the planetary gears are configured to rotatably engage a ring gear 1224, optionally wherein the at least one intermediate transmission gear 1226 comprises a sun gear 1102, optionally wherein the sun gear 1102 is configured to rotatably engage the at least one planetary gear (e.g., planetary gears 1206, 1208, 1210, 1212 of FIG. 12) of a planetary gear set, optionally the planetary gear set comprises a planet carrier gear (which can be the first protruding gear 0104), optionally the planet carrier gear comprises a rotary disk 1214 directly or indirectly fixed to the protruding portion of the first protruding gear 0104, optionally the planet carrier gear comprising at least one axle (e.g., axles 1216, 1218, 1220, 1222) for the at least one planetary gear, the at least one axle being fixed in immovable or rotatable relation to the rotary disk 1214, optionally the planetary gear set comprising at least one planetary gear (e.g., planetary gears 1206, 1208, 1210, 1212), optionally the planetary gear set comprising a ring gear 1224 configured to engage the at least one planetary gear (e.g., planetary gears 1206, 1208, 1210, 1212) and cause each gear in the at least one planetary gear to travel in an orbital path 1228 (e.g., circular path) along the interior of the ring gear 1224, optionally the planetary gear set comprising a sun gear 1102 (e.g., as illustrated in FIG. 11 or FIG. 12) configured to rotatably engage the at least one planetary gear (e.g., planetary gears 1206, 1208, 1210, 1212);

optionally wherein the first transmission gear set 1202 comprises a first protruding gear 0104;

optionally the first a first protruding gear 0104 comprises a rotary disk 1214 immovably fixed in relation to the protruding portion 0108 of the protruding gear 0104, the rotary disk 1214 comprising at least one axle for the at least one intermediate transmission gear 1226 of the first transmission gear set 1202, optionally the at least one axle is for the at least one planetary gear (e.g., planetary gears 1206, 1208, 1210, 1212) of the planetary gear set, optionally the at least one axle comprises an axle for each planetary gear in the planetary gear set, optionally the first transmission gear set 1202 is configured so that rotation of the first protruding gear 0104 causes rotation of the rotary disk 1214, the rotation of the rotary disk 1214 causes the revolution of the at least one axle (e.g., one axle, two axles, three axles, four axles or each of the plurality of axles in the at least one axle) around the axis of rotation of the rotary disk (e.g., the first referential axis of rotation of the first protruding gear 0104), the revolution of the at least one axle causes the at least one intermediate transmission gear 1226 (e.g., at least one planetary gear or planetary gears 1206, 1208, 1210, 1212), one planetary gear, two planetary gears, three planetary gears, or four planetary gears) to travel in an engaged rotary motion along the ring gear 1224 (e.g., inner ring inner socket perimeter of the ring gear 1224), and the engaged rotary motion of the at least one intermediate transmission gear 1226 causes each gear in the at least one intermediate transmission gear 1226 to rotate around the axle of the gear, optionally the at least one intermediate transmission gear 1226 forms a void that forms the first transmission socket 0202 or the at least one intermediate transmission gear 1226 rotatably engages a sun gear 1102 to cause the rotation of the sun gear 1102, and the sun gear 1102 comprises a void that forms the first transmission socket 0202;

optionally the first transmission gear set 1202 is configured so that the first protruding gear 0104 (e.g., planet carrier gear and its rotary disk 1214) is configured to rotate counter-clockwise around the first referential axis of rotation 0106 as viewed when facing the first protruding gear 0104 (e.g., the rotational direction shown in FIG. 1, FIG. 10, FIG. 11, and FIG. 12), optionally the first transmission gear set is configured so that the first protruding gear 0104 (e.g., planet carrier gear and its rotary disk 1214) is configured to rotate clockwise around the first referential axis of rotation 0106 as viewed when facing the first protruding gear 0104 (e.g., opposite the rotational direction shown in FIG. 1, FIG. 10, FIG. 11, and FIG. 12), optionally the first transmission gear set is configured so that the first protruding gear 0104 (e.g., planet carrier gear and its rotary disk 1214) is configured to rotate both counter-clockwise and clockwise around the first referential axis of rotation 0106 as viewed when facing the first protruding gear 0104;

optionally the first transmission gear set 1202 is configured so that the planetary gears rotate along their axes of rotation in a rotational direction that is opposite the rotational direction 0110 of the first protruding gear 0104 (e.g., as illustrated in FIG. 1, FIG. 10, FIG. 11, and FIG. 12);

optionally the first transmission gear set 1202 is configured so that the planetary gears travel in an orbital path 1228 (e.g., circular path) along the interior of the ring gear 1224 that is in the same direction as the rotational direction 0110 of the first protruding gear 0104 (e.g., as illustrated in FIG. 1, FIG. 10, FIG. 11, and FIG. 12);

optionally the first transmission gear set 1202 is configured so that a protruding gear that is rotatably engaged with the first transmission socket 0202 will rotate in the same direction as the rotational direction 0110 of the first protruding gear 0104 ((e.g., as illustrated in FIG. 1, FIG. 10, FIG. 11, and FIG. 12);

optionally, the modular gear transmission 0100 is configured so that when the first protruding gear 0104 rotates at a first rotational velocity and when the first transmission socket 0202 is rotatably engaged with the second protruding gear 1106, then the second protruding gear 1106 rotates at a second rotational velocity, optionally the ratio of the first rotational velocity to the second rotational velocity is fixed, optionally the ratio of the first rotational velocity to the second rotational velocity is greater than 1:1 (e.g., 5:1, 4:1, 3:1, or 2:1), 1:1, or less than 1:1 (e.g., 1:2, 1:3, 1:4, or 1:5);

optionally, the modular gear transmission 0100 is configured to have a disengaged configuration (e.g., as illustrated in FIG. 10, FIG. 11 or FIG. 12) in which the first transmission body 0102 disengages the first transmission gear set 1202 to enable the first transmission gear set 1202 (or first intermediate gear set 1204) to be replaced with an alternate transmission gear set, the modular gear transmission 0100 is configured to have a disengaged configuration (e.g., as illustrated in FIG. 10, FIG. 11 or FIG. 12) in which the first transmission body 0102 disengages the first intermediate gear set 1204 to enable the first intermediate gear set 1204 to be replaced with an alternate intermediate gear set 1204, optionally the alternate transmission gear set being configured so that the modular gear transmission 0100 can be placed in an alternate assembled configuration in which (i) the first transmission body 0102 engages the alternate transmission gear set to hold the alternate transmission gear set in a rotatable configuration, (ii) the first protruding gear 0104 protrudes from the first transmission body 0102 and is directly or indirectly rotatably engaged with an alternate intermediate gear set of the alternate transmission gear set, and (iii) the alternate transmission socket is directly or indirectly rotatably engaged with the alternate intermediate gear set, the alternate transmission socket being configured to rotatably engage a second protruding gear 1106 that is identical to the first protruding gear 0104; or any combination thereof.

3. The modular gear transmission of any preceding clause, wherein the first transmission body 0102 comprises at least one feature selected from the following group of features:

optionally a first containment wall 1230 (e.g., as illustrated in FIG. 12);

optionally a first protrusion-end plate 1232;

optionally a first socket-end plate 1234; or any combination thereof.

4. The modular gear transmission of clause 3, the modular gear transmission comprising at least one feature selected from the following group of features:

optionally the first containment wall 1230 has a first inner surface that is the inner surface of the ring gear 1224 having a ring gear central axis, the ring gear central axis being coaxial with the first referential axis of rotation 0106 of the first protruding gear 0104, optionally the ring gear 1224 has ring gear teeth 1236 that face inwardly, optionally the ring gear 1224 has ring gear teeth 1236 that face toward the first referential axis of rotation 0106; optionally wherein the ring gear 1224 has ring gear teeth 1236 that directly or indirectly engage teeth of another gear or other gears of the at least one intermediate transmission gear 1226 (e.g., at least one planetary gear, or planetary gears 1206, 1208, 1210, 1212);

optionally the first containment wall 1230 comprises at least one alignment socket 0112, the at least one alignment socket 0112 comprising an alignment socket 0112 configured to receive an alignment element 0802 that engages the alignment socket 0112 to register the alignment socket 0112 into a desired position relative to a first reference point on a connected object (e.g., any reference point on a connected driver 0608, connected output gear transmission, or connected modular gear transmission, for example, as illustrated in FIG. 8); optionally the at least one alignment socket 0112 has an alignment socket central axis 0114 that is parallel with the first referential axis of rotation 0106; optionally the at least one alignment socket 0112 comprises a plurality of alignment sockets, each alignment socket in the plurality of alignment sockets being configured to register the alignment socket into a desired position relative to a first reference point on a connected object (e.g., any reference point on a connected driver 0608, connected output gear transmission, or connected modular gear transmission, for example, as illustrated in FIG. 8); optionally each alignment socket in the at least one alignment socket 0112 is configured to restrict the motion of the containment wall to rotation about the alignment socket central axis 0114, for example, so that two or more alignment sockets can be used to prevent the modular gear transmission from rotating or moving in any direction except sliding along the two or more alignment sockets;

optionally the first containment wall 1230 comprises at least one wall protrusion 0116 (e.g., 1, 2, or 3 or more protrusions, for example, as illustrated in FIG. 9 and FIG. 12), each protrusion configured to extend between two alignment sockets 0112 of a second modular gear transmission 0604 engaged with the first modular gear transmission 0602 thereby preventing the second modular gear transmission 0604 from rotating by more than 5, 4, 3, 2 or 1 degrees relative to the first modular gear transmission 0602 (e.g., as illustrated in FIG. 6 through FIG. 9); optionally wherein the at least one wall protrusion 0116 extends from the first containment wall 1230 adjacent to the first socket-end plate 1234, optionally wherein the at least one wall protrusion 0116 extends distally and past the first socket-end plate 1234 as measured along the first referential axis of rotation 0106 (e.g., as illustrated in FIG. 9 and FIG. 12);

optionally the first protrusion-end plate 1232 is configured to engage and disengage the first containment wall 1230, thereby providing access to replace the first transmission gear set 1202, the first protruding gear 0104, the first intermediate gear set 1204, the first transmission socket 0202, or a combination thereof;

optionally the first protrusion-end plate 1232 comprises a first protrusion aperture 1238 configured to permit the first protruding gear 0104 to protrude through the first protrusion aperture 1238, optionally the first referential axis of rotation 0106 passes through the first protrusion aperture 1238;

optionally the first socket-end plate 1234 is configured to engage and disengage the first containment wall 1230, thereby providing access to replace the first protruding gear 0104, the first transmission gear set 1202, the first transmission socket 0202, or a combination thereof;

optionally the first socket-end plate 1234 comprises a first socket aperture 1240 configured to permit the second protruding gear 1106 to protrude through the first socket aperture 1240 to engage the first transmission socket 0202;

optionally the first referential axis of rotation 0106 passes through the first socket aperture 1240; or any combination thereof;

5. The modular gear transmission of any preceding clause, the modular gear transmission comprising at least one feature selected from the following group of features:

optionally the first transmission body 0102 comprises a ring gear 1224, optionally the first containment wall 1230 has a first inner surface that is the inner surface of the ring gear 1224 having a ring gear central axis, the ring gear central axis being coaxial with the first referential axis of rotation 0106 of the first protruding gear 0104, optionally the ring gear 1224 has ring gear teeth 1236 that face inwardly, optionally the ring gear 1224 has ring gear teeth 1236 that face toward the first referential axis of rotation 0106; optionally wherein the ring gear 1224 has ring gear teeth 1236 that directly or indirectly engage teeth of another gear or other gears of the at least one intermediate transmission gear 1226 (e.g., at least one planetary gear, or planetary gears 1206, 1208, 1210, 1212); or any combination thereof.

6. A system comprising the modular gear transmission of any preceding clause, the system optionally comprising at least one feature selected from the following group of features:

another modular gear transmission according to any preceding clause;

any feature of a system described in this application;

any feature of a modular gear transmission described in this application; or any combination thereof.

7. The system of any preceding clause, the system 0600 comprising a plurality of modular gear transmissions (e.g., being connected in series), the system 0600 comprising:

(i) the modular gear transmission 0100 of claim [insert reference to all claims above], the modular gear transmission 0100 being a first modular gear transmission 0602 (e.g., a modular gear transmission with a 3:1 gear ratio as illustrated in the first modular gear transmission 0602 in FIG. 1 through FIG. 9 and FIG. 12, although the first modular gear transmission 0602 can also be replaced with a modular gear transmission with a 4:1 gear ratio as illustrated in the second modular gear transmission 0604 in FIG. 6 though FIG. 9 and FIG. 11 or a modular gear transmission with a 5:1 gear ratio as illustrated in the third modular gear transmission 0606 in FIG. 6 through FIG. 10 or a modular gear transmission with any other gear ratio); and (ii) a second modular gear transmission 0604 rotatably engaged with the first modular gear transmission 0602, the second modular gear transmission 0604 having a second assembled configuration (e.g., as illustrated in FIG. 6), and the second modular gear transmission 0604 comprising:

a second transmission body 0804, and
a second transmission gear set 1104;
the second transmission gear set 1104 comprising:
a second protruding gear 1106,
a second intermediate gear set 1108 comprising at least one intermediate transmission gear 1226, and
a second transmission socket 0902;

the second transmission body 0804 configured so that, when the second modular gear transmission 0604 is in the second assembled configuration, the second transmission body 0804 engages the second transmission gear set 1104 to hold the second transmission gear set 1104 in a rotatable configuration;

the second protruding gear 1106 configured so that, when the second modular gear transmission 0604 is in the second assembled configuration, the second protruding gear 1106 protrudes from the second transmission body 0804 and is directly or indirectly rotatably engaged with the second intermediate gear set 1108, the second protruding gear 1106 configured to rotate around a second referential axis of rotation (e.g., which can be coaxial with the first referential axis of rotation 0106);

the second transmission socket 0902 configured so that, when the second modular gear transmission 0604 is in the second assembled configuration, the second transmission socket 0902 is directly or indirectly rotatably engaged with the second intermediate gear set 1108, the second transmission socket 0902 being configured to rotatably engage a third protruding portion 0810 of a third protruding gear 1014 that is identical to a second protruding portion 0808 of the second protruding gear 1106, a first protruding portion 0108 of the first protruding gear 0104, or a combination thereof, optionally the third protruding gear 1014 is identical to the second protruding gear 1106, the first protruding gear 0104, or a combination thereof.

8. The system of clause 7, the system comprising at least one feature from the following group of features:

optionally the second modular gear transmission 0604 comprises an analogous or identical component for any component that is included or that can be included in the modular gear transmission 0100;

optionally the second modular gear transmission 0604 comprises an analogous or identical sub-component for any sub-component that is included or that can be included in the modular gear transmission 0100;

optionally the second modular gear transmission 0604 comprises an analogous or identical characteristic for any characteristic that is included or that can be included in the modular gear transmission 0100; or any combination thereof.

9. The system of clause 7 or clause 8, the system 0600 comprising a third modular gear transmission 0606, the third modular gear transmission 0606 rotatably engaged with the second modular gear transmission 0604 (e.g., as illustrated in FIG. 6 through FIG. 9), and the third modular gear transmission 0606 having a third assembled configuration (e.g., as illustrated in FIG. 6 through FIG. 9), the third modular gear transmission 0606 comprising:

a third transmission body 0806, and
a third transmission gear set 1002;
the third transmission gear set 1002 comprising:
a third protruding gear 1014,
a third intermediate gear set 1004 comprising at least one intermediate transmission gear, and
a third transmission socket 0904;

the third transmission body 0806 configured so that, when the third modular gear transmission 0606 is in the third assembled configuration, the third transmission body 0806 engages the third transmission gear set 1002 to hold the third transmission gear set 1002 in a rotatable configuration;

the third protruding gear 1014 configured so that, when the third modular gear transmission 0606 is in the third assembled configuration, the third protruding gear 1014 protrudes from the third transmission body 0806 and is directly or indirectly rotatably engaged with the third intermediate gear set 1004, the third protruding gear 1014 configured to rotate around a third referential axis of rotation (e.g., which can be coaxial with the first referential axis of rotation 0106), the third transmission socket 0904 configured so that, when the third modular gear transmission 0606 is in the third assembled configuration, the third transmission socket 0904 is directly or indirectly rotatably engaged with the third intermediate gear set 1004, the third transmission socket 0904 being configured to rotatably engage a fourth protruding portion of a fourth protruding gear that is identical to a third protruding portion 0810 of the third protruding gear 1014, a second protruding portion 0808 of the second protruding gear 1106, a first protruding portion 0108 of the first protruding gear 0104, or a combination thereof, optionally the fourth protruding gear is identical to the third protruding gear 1014, the second protruding gear 1106, the first protruding gear 0104 or a combination thereof.

10. The system of clause 9, the system comprising at least one feature from the following group of features:

optionally the third modular gear transmission 0606 comprises an analogous or identical component for any component that is included or that can be included in the modular gear transmission 0100;

optionally the third modular gear transmission 0606 comprises an analogous or identical sub-component for any sub-component that is included or that can be included in the modular gear transmission 0100;

optionally the third modular gear transmission 0606 comprises an analogous or identical characteristic for any characteristic that is included or that can be included in the modular gear transmission 0100; or any combination thereof.

11. The system of any preceding clause, the system comprising at least one feature from the following group of features:

optionally the system 0600 comprises a plurality of modular gear transmissions (e.g., two, three, four, five, six, seven, eight, nine, ten or more modular gear transmissions 0100) including the modular gear transmission 0100 (or the first modular gear transmission 0602), the second modular gear transmission 0604, the third modular gear transmission 0606, or a combination thereof, each modular gear transmission 0100 in the plurality of modular gear transmissions being configured to rotatably engage any of the other modular gear transmissions 0100 in the plurality of modular gear transmissions; optionally the modular gear transmissions 0100 are all configured so that each of the modular gear transmissions 0100 can be interposed between and directly rotatably engage a driver 0608 and any of the other modular gear transmissions 0100, the driver 0608 serving to rotate the gears of the modular gear transmissions 0100; optionally each modular gear transmission 0100 in the plurality of modular gear transmissions is configured to be connected to a driver 0608 by any of the other modular gear transmissions 0100 in the plurality of modular gear transmissions, the driver 0608 serving to rotate the gears of the modular gear transmissions 0100;

optionally wherein a plurality of the modular gear transmissions 0100 are connected and rotatably engaged to provide an overall rotational velocity ratio, the overall rotational velocity ratio being the ratio of the rotational velocity of a driver 0608 to the rotational velocity of a driven component, the driver 0608 being directly connected to a modular gear transmission 0100 at a first end 0610 of the plurality of modular gear transmissions, and the driven component being directly connected to a modular gear transmission 0100 at a second end 0612 of the plurality of modular gear transmissions (e.g., 0602, 0604, 0606 as illustrated in FIG. 6, FIG. 8 and FIG. 9), the second end 0612 of the plurality of modular gear transmissions being opposite the first end 0610 of the plurality of modular gear transmissions (e.g., 0602, 0604, 0606 as illustrated in FIG. 6, FIG. 8 and FIG. 9); or any combination thereof.

12. The system of any preceding clause, the system comprising at least one feature from the following group of features:

optionally the system 0600 comprises a modular gear transmission (e.g., any modular gear transmission described herein) and a driver 0608;

optionally the driver 0608 is configured to be directly or indirectly rotatably engaged with the modular gear transmission 0100 (or the first modular gear transmission 0602), the second modular gear transmission 0604, the third modular gear transmission 0606, or the last modular gear transmission 0100 in a plurality of modular gear transmissions;

optionally the driver 0608 is configured to engage the first transmission socket 0202, the second transmission socket 0902, the third transmission socket 0904, or the transmission socket of the last modular gear transmissions 0100 in a plurality of modular gear transmissions;

optionally the driver 0608 comprises a driver protrusion-end surface 0812 and the system 0600 comprises a driver protrusion-end plate 0814 configured to be fixed to the driver 0608 and the modular gear transmission 0100 (or the first modular gear transmission 0602), the second modular gear transmission 0604, the third modular gear transmission 0606, or the last modular gear transmission 0100 in a plurality of modular gear transmissions, optionally the driver protrusion-end plate 0814 is configured to immobilize the driver protrusion-end surface 0812 relative to the modular gear transmission 0100 (or the first modular gear transmission 0602), the second modular gear transmission 0604, the third modular gear transmission 0606, or the last modular gear transmission 0100 in a plurality of modular gear transmissions;

optionally the driver protrusion-end surface 0812 is configured to be directly fixed to the modular gear transmission 0100 (or the first modular gear transmission 0602), the second modular gear transmission 0604, the third modular gear transmission 0606, or the last modular gear transmission 0100 in a plurality of modular gear transmissions, optionally the driver protrusion-end surface 0812 is configured to immobilize the driver protrusion-end surface 0812 relative to the modular gear transmission 0100 (or the first modular gear transmission 0602), the second modular gear transmission 0604, the third modular gear transmission 0606, or the last modular gear transmission 0100 in a plurality of modular gear transmissions; or any combination thereof.

13. The system of any preceding clause, the system comprising at least one feature from the following group of features:

optionally the system 0600 comprises a modular gear transmission (e.g., any modular gear transmission described herein) and an output gear transmission 0816 comprising an output gear transmission set (e.g., as illustrated in FIG. 8), the output gear transmission 0816 set comprising at least one output transmission gear;

optionally the output gear transmission 0816 is a female output gear transmission 0816 (e.g., as illustrated in FIG. 8), optionally the output gear transmission 0816 is configured to be directly or indirectly rotatably engaged with a driven component (e.g., having a male connection to the female output gear transmission or a driven component having a female connection if the output gear is a male output gear transmission);

optionally the output gear transmission 0816 is configured to engage the protruding gear of the modular gear transmission 0100 or the first protruding gear 0104 of the first modular gear transmission 0602 in a plurality of modular gear transmissions;

optionally the output gear transmission 0816 comprises an output gear body 0818 configured to engage the output gear transmission set of the output gear transmission 0816 to hold the output gear transmission set in a rotatable configuration, the output gear transmission set having at least one output gear configured to be directly or indirectly rotatably engaged with (i) the driven component and (ii) a modular gear transmission or the first modular gear transmission in a plurality of modular gear transmissions that are connected in series;

optionally the output gear body 0818 comprises at least one alignment socket 0112, the at least one alignment socket 0112 configured to receive an alignment element 0802 that engages the alignment socket to register the alignment socket into a desired position relative to the first transmission body 0102; or any combination thereof.

14. The system of any preceding clause, the system comprising at least one feature from the following group of features:

optionally the system 0600 comprises an alignment element 0802 (e.g., fastener, screw, bolt, or rod) configured to pass through an alignment socket of the output gear body 0818, the first transmission body 0102, the second transmission body 0804, the third transmission body 0806, the fourth transmission body, a plurality of transmission bodies in a plurality of modular gear transmissions, the driver protrusion-end plate 0814, the driver protrusion-end surface 0812, the driver 0608 or a combination thereof;

optionally the system 0600 comprises a plurality of alignment elements 0802 (e.g., fasteners, screws, bolts, rods), each alignment element 0802 in the plurality of alignment elements 0802 configured to pass through an alignment socket 0112 of the output gear body 0818, the first transmission body 0102, the second transmission body 0804, the third transmission body 0806, the fourth transmission body, a plurality of transmission bodies in a plurality of modular gear transmissions, the driver protrusion-end plate 0814, the driver protrusion-end surface 0812, the driver 0608 or a combination thereof; or any combination thereof.

15. The system of any preceding clause, the system comprising at least one feature from the following group of features:

optionally the system 0600 comprises a modular gear transmission (e.g., any modular gear transmission described herein) and comprises a driven component;

optionally the driven component is configured to engage the output gear transmission 0816 (e.g., female output gear transmission 0816, the driven component having a connector shaped like the protruding portion of a protruding gear or the driver);

optionally the driven component is configured to engage a male output gear transmission (e.g., having a connector shaped like the transmission socket 0202, 0902, 0904 of a modular gear transmission);

optionally the driven component is configured to engage a protruding gear of the modular gear transmission 0100 or the first protruding gear 0104 of the first modular gear transmission 0602 in a plurality of modular gear transmissions, the driver, the output gear transmission or a combination thereof (e.g., the driven component having a connector shaped like the transmission socket of a modular gear transmission); or any combination thereof.

Although the invention has been described above and in the drawings using a modular gear transmission that is generally the shape of a hexagonal prism with some cylindrical features as well, the modular gear transmission is not limited to this shape. For example, the numbers of sides can change, the edges can be rounded, or the shape can be more or less hexagonal or cylindrical.

Although embodiments of the invention have been described using the word "comprising," additional embodiments can be created by replacing the word "comprising" with "consisting essentially of" or "consisting of."

Although embodiments of the invention have been described using a first range with a first set of end points, additional embodiments can be created by replacing the first range with a narrower range whose endpoints are selected from any value contained in the first range.

Although embodiment of the invention have been described using a specific direction relative to a reference direction, additional embodiments can be created by indicating that specific direction can vary from the reference direction by no more than 45, 40, 35, 30, 25, 20, 15, 10, 9, 8, 7, 6, 5, 4, 3, 2 or 1 degrees.

Although embodiment of the invention have been described using a specific orientation (e.g., coaxial) relative to a reference orientation (e.g., first referential axis of rotation), additional embodiments can be created by indicating that specific orientation can vary from the reference orientation by no more than 45, 40, 35, 30, 25, 20, 15, 10, 9, 8, 7, 6, 5, 4, 3, 2 or 1 degrees.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A modular gear transmission having an assembled configuration, the modular gear transmission comprising:
   a first transmission body and a first transmission gear set;
   the first transmission gear set comprising:
      a first protruding gear,
      a first intermediate gear set comprising at least one intermediate transmission gear, and
      a first transmission socket;
   the first transmission body configured so that, when the modular gear transmission is in the assembled configuration, the first transmission body engages the first transmission gear set to hold the first transmission gear set in a rotatable configuration;
   the first protruding gear configured so that, when the modular gear transmission is in the assembled configuration, the first protruding gear protrudes from the first transmission body and is directly or indirectly rotatably engaged with the first intermediate gear set, the first protruding gear configured to rotate around a first referential axis of rotation;
   the first transmission socket configured so that, when the modular gear transmission is in the assembled configuration, the first transmission socket is directly or indirectly rotatably engaged with first intermediate gear set;
   the first transmission body comprising:
      a first containment wall,
      a first protrusion-end plate, and a first socket-end plate;
the first containment wall comprising at least one alignment socket, the at least one alignment socket comprising an alignment socket configured to receive an alignment element that engages the alignment socket to register the alignment socket into a desired position relative to a first reference point on a connected object:
the first protrusion-end plate configured to be engaged with the first containment wall; and
the first socket-end plate configured to be engaged with the first containment wall.

2. The modular gear transmission of claim 1, the first protruding gear being a planet carrier gear.

3. The modular gear transmission of claim 1, the modular gear transmission being configured so that, when the modular gear transmission is in the assembled configuration, the first protruding gear is engaged by the first transmission body and thereby held in direct or indirect rotatable engagement with the first intermediate gear set.

4. The modular gear transmission of claim 1, the first transmission socket being configured to rotatably engage a second protruding portion of a second protruding gear that is identical to a first protruding portion of the first protruding gear.

5. The modular gear transmission of claim 1, the first transmission gear set comprising a planetary gear set, the first transmission gear set being configured so that a protruding gear that is rotatably engaged with a first transmission socket of the first transmission gear set will rotate in the same direction as the rotational direction of the first protruding gear.

6. The modular gear transmission of claim 1, the modular gear transmission configured so that when the first protruding gear rotates at a first rotational velocity and when the first transmission socket is rotatably engaged with a second protruding gear, then the second protruding gear rotates at a second rotational velocity that differs from the first rotational velocity.

7. The modular gear transmission of claim 6, the ratio of the first rotational velocity to the second rotational velocity being fixed.

8. The modular gear transmission of claim 1, the modular gear transmission being configured to have a disengaged configuration in which the first transmission body disengages the first transmission gear set to enable the first transmission gear set to be replaced with an alternate transmission gear set.

9. The modular gear transmission of claim 8, the alternate transmission gear set being configured so that the modular gear transmission can be placed in an alternate assembled configuration in which (i) the first transmission body engages the alternate transmission gear set to hold the alternate transmission gear set in a rotatable configuration, (ii) the first protruding gear protrudes from the first transmission body and is directly or indirectly rotatably engaged with an alternate intermediate gear set of the alternate transmission gear set, and (iii) an alternate transmission socket of the alternate transmission gear set is directly or indirectly rotatably engaged with the alternate intermediate gear set, the alternate transmission socket being configured to rotatably engage a second protruding gear that is identical to the first protruding gear.

10. The modular gear transmission of claim 1, the modular gear transmission being a first modular gear transmission, the first containment wall comprising at least one wall protrusion, each protrusion in the at least one wall protrusion being configured to extend between two alignment sockets of a second modular gear transmission engaged with the first modular gear transmission, thereby preventing the second modular gear transmission from rotating by more than 5 degrees relative to the first modular gear transmission.

11. The modular gear transmission of claim 1, the first protrusion-end plate configured to engage and disengage the first containment wall, thereby providing access to replace the first transmission gear set, the first protruding gear, the first intermediate gear set, the first transmission socket, or a combination thereof.

12. The modular gear transmission of claim 1, the first protrusion-end plate comprising a first protrusion aperture configured to permit the first protruding gear to protrude through the first protrusion aperture, the first referential axis of rotation passing through the first protrusion aperture.

13. The modular gear transmission of claim 1, the first socket-end plate being configured to engage and disengage the first containment wall, thereby providing access to replace the first protruding gear, the first transmission gear set, the first transmission socket of the first transmission gear set, or a combination thereof.

14. The modular gear transmission of claim 1, the first socket-end plate comprising a first socket aperture configured to permit a second protruding gear to protrude through the first socket aperture to engage the first transmission socket, the first referential axis of rotation passing through the first socket aperture.

15. A system comprising a plurality of modular gear transmissions, the system comprising:
(i) the modular gear transmission of claim 1, the modular gear transmission being a first modular gear transmission; and
(ii) a second modular gear transmission rotatably engaged with the first modular gear transmission, the second modular gear transmission having a second assembled configuration,
the second modular gear transmission comprising a second transmission body and a second transmission gear set;
the second transmission gear set comprising:
a second protruding gear,
a second intermediate gear set comprising at least one intermediate transmission gear, and
a second transmission socket;
the second transmission body configured so that, when the second modular gear transmission is in the second assembled configuration, the second transmission body engages the second transmission gear set to hold the second transmission gear set in a rotatable configuration;
the second protruding gear configured so that, when the second modular gear transmission is in the second assembled configuration, the second protruding gear protrudes from the second transmission body and is directly or indirectly rotatably engaged with the second intermediate gear set, the second protruding gear configured to rotate around a second referential axis of rotation;
the second transmission socket configured so that, when the second modular gear transmission is in the second assembled configuration, the second transmission socket is directly or indirectly rotatably engaged with the second intermediate gear set, the second transmission socket being configured to rotatably engage a third protruding portion of a third protruding gear that is identical to a first protruding portion of the first protruding gear.

16. The system of claim 15, the system comprising (iii) a third modular gear transmission, the third modular gear transmission rotatably engaged with the second modular gear transmission, and the third modular gear transmission having a third assembled configuration, the third modular gear transmission comprising:
  a third transmission body and a third transmission gear set;
  the third transmission gear set comprising:
    the third protruding gear,
    a third intermediate gear set comprising at least one intermediate transmission gear, and
    a third transmission socket;
  the third transmission body configured so that, when the third modular gear transmission is in the third assembled configuration, the third transmission body engages the third transmission gear set to hold the third transmission gear set in a rotatable configuration;
  the third protruding gear configured so that, when the third modular gear transmission is in the third assembled configuration, the third protruding gear protrudes from the third transmission body and is directly or indirectly rotatably engaged with the third intermediate gear set, the third protruding gear configured to rotate around a third referential axis of rotation,
  the third transmission socket configured so that, when the third modular gear transmission is in the third assembled configuration, the third transmission socket is directly or indirectly rotatably engaged with the third intermediate gear set, the third transmission socket being configured to rotatably engage a fourth protruding portion of a fourth protruding gear that is identical to the first protruding portion of the first protruding gear.

17. The system of claim 15, wherein the plurality of modular gear transmissions are connected and rotatably engaged to provide an overall rotational velocity ratio, the overall rotational velocity ratio being the ratio of the rotational velocity of a driver to the rotational velocity of a driven component, the driver being directly connected to a modular gear transmission at a first end of the plurality of modular gear transmissions, and the driven component being directly connected to a modular gear transmission at a second end of the plurality of modular gear transmissions, the second end of the plurality of modular gear transmissions being opposite the first end of the plurality of modular gear transmissions.

18. A system comprising the modular gear transmission of claim 1 and a driver;
  the driver being configured to be directly or indirectly rotatably engaged with the modular gear transmission.

19. The system of claim 18, the driver comprising a driver protrusion-end surface and the system comprising a driver protrusion-end plate configured to be fixed to the driver and the modular gear transmission.

20. The system of claim 18, the system comprising an output gear transmission, the output gear transmission comprising an output gear set, the output gear set comprising at least one output transmission gear;
  the output gear transmission being configured to engage the first protruding gear of the plurality of modular gear transmissions.

21. The system of claim 20, the system comprising a driven component;
  the driven component being configured to engage the output gear transmission.

22. A modular gear transmission having an assembled configuration, the modular gear transmission comprising:
  a first transmission body and a first transmission gear set;
  the first transmission gear set comprising:
    a first protruding gear,
    a first intermediate gear set comprising at least one intermediate transmission gear, and
    a first transmission socket;
  the first transmission body configured so that, when the modular gear transmission is in the assembled configuration, the first transmission body engages the first transmission gear set to hold the first transmission gear set in a rotatable configuration;
  the first protruding gear configured so that, when the modular gear transmission is in the assembled configuration, the first protruding gear protrudes from the first transmission body and is directly or indirectly rotatably engaged with the first intermediate gear set, the first protruding gear configured to rotate around a first referential axis of rotation;
  the first transmission socket configured so that, when the modular gear transmission is in the assembled configuration, the first transmission socket is directly or indirectly rotatably engaged with the first intermediate gear set;
  the first transmission body comprising:
    a first containment wall,
    a first protrusion-end plate, and
    a first socket-end plate;
  the first protrusion-end plate configured to be engaged with the first containment wall;
  the first socket-end plate configured to be engaged with the first containment wall; and
  the modular gear transmission being a first modular gear transmission, the first containment wall comprising at least one wall protrusion, each protrusion in the at least one wall protrusion being configured to extend between two alignment sockets of a second modular gear transmission engaged with the first modular gear transmission, thereby preventing the second modular gear transmission from rotating by more than 5 degrees relative to the first modular gear transmission.

* * * * *